US011991677B2

(12) United States Patent
Abotabl et al.

(10) Patent No.: US 11,991,677 B2
(45) Date of Patent: May 21, 2024

(54) FULL DUPLEX FOR AVAILABLE RESOURCES

(71) Applicant: QUALCOMM Incorporated, San Diego, CA (US)

(72) Inventors: Ahmed Attia Abotabl, San Diego, CA (US); Giovanni Chisci, San Diego, CA (US); Muhammad Sayed Khairy Abdelghaffar, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 282 days.

(21) Appl. No.: 17/469,756

(22) Filed: Sep. 8, 2021

(65) Prior Publication Data

US 2022/0086839 A1 Mar. 17, 2022

Related U.S. Application Data

(60) Provisional application No. 63/079,916, filed on Sep. 17, 2020.

(51) Int. Cl.
 H04W 72/0453 (2023.01)
 H04W 72/20 (2023.01)
(52) U.S. Cl.
 CPC ....... H04W 72/0453 (2013.01); H04W 72/20 (2023.01)
(58) Field of Classification Search
 None
 See application file for complete search history.

(56) References Cited

U.S. PATENT DOCUMENTS

| 11,558,865 | B2* | 1/2023 | Tang | H04L 5/0032 |
| 2008/0037507 | A1* | 2/2008 | Fukumoto | H04W 88/04 370/347 |
| 2009/0268630 | A1* | 10/2009 | Yellin | H04L 27/2647 370/252 |
| 2017/0332376 | A1* | 11/2017 | He | H04L 5/18 |
| 2018/0191483 | A1* | 7/2018 | Yamazaki | H04W 74/0833 |
| 2020/0228196 | A1 | 7/2020 | John Wilson et al. | |
| 2021/0067992 | A1* | 3/2021 | Kusashima | H04W 24/08 |
| 2021/0120630 | A1* | 4/2021 | Zhang | H04W 72/23 |
| 2022/0029761 | A1* | 1/2022 | Su | H04L 27/2613 |
| 2022/0322472 | A1* | 10/2022 | Kusashima | H04W 76/15 |
| 2022/0393810 | A1* | 12/2022 | Zhang | H04W 4/46 |
| 2023/0040933 | A1* | 2/2023 | Kim | H04W 74/08 |

FOREIGN PATENT DOCUMENTS

EP 3681233 A1 7/2020

OTHER PUBLICATIONS

International Search Report and Written Opinion—PCT/US2021/049706—ISA/EPO—dated Dec. 21, 2021.

* cited by examiner

Primary Examiner — Duc T Duong
(74) Attorney, Agent, or Firm — Arun Swain

(57) ABSTRACT

A method of wireless communication at a user equipment (UE) includes receiving an indication of available frequency resources, receiving direction information, and determining one or more communication directions for each of the available frequency resources based on the direction information. The method also includes communicating with a base station using the available frequency resources based on the determined one or more communication directions for each of the available frequency resources.

27 Claims, 16 Drawing Sheets

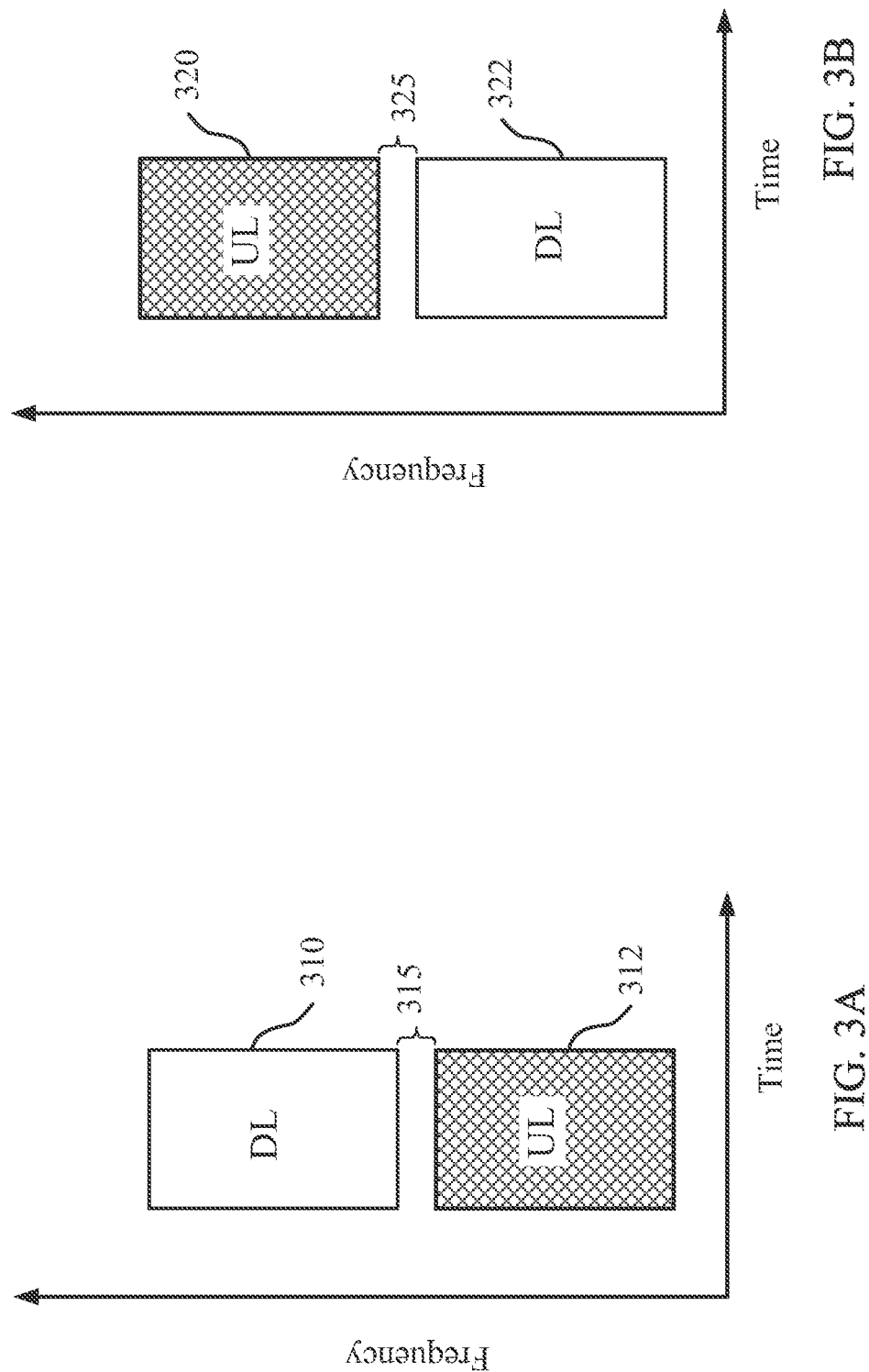

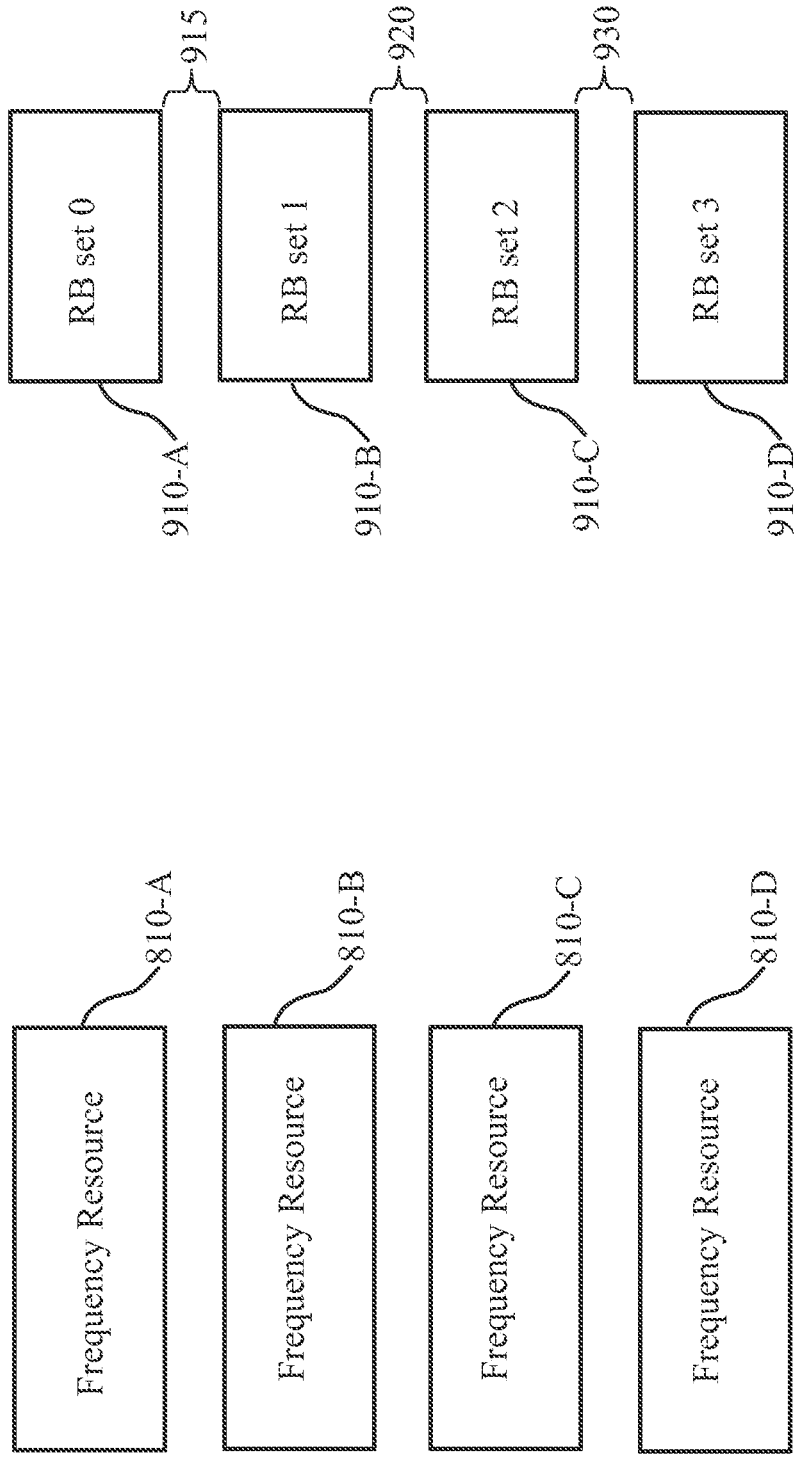

FULL DUPLEX FOR AVAILABLE RESOURCES

RELATED APPLICATION

This application claims priority under 35 U.S.C. § 119(e) to U.S. Provisional Application No. 63/079,916 filed on Sep. 17, 2020, the entire specification of which is incorporated herein by reference.

BACKGROUND

Field

Aspects of the present disclosure relate generally to wireless communications, and more particularly, to full duplex for available resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include multiple base stations or network access nodes, each simultaneously supporting communication for multiple communication devices, which may be otherwise known as user equipment (UE).

A base station (e.g., gNB) and a UE in a wireless system (e.g., NR system) may communicate with each other in a spectrum (e.g., unlicensed spectrum) that is shared with devices in another wireless system (e.g., WiFi system). To avoid interfering with devices in the other wireless system, the base station may sense the spectrum (e.g., in a listen-before-talk (LBT) procedure) to determine which portions of the spectrum are available (e.g., unoccupied). The base station may then transmit a control message (e.g., downlink control information (DCI)) to the UE indicating one or more available portions of the spectrum. The base station and the UE may then communicate with each other using the one or more available portions of the spectrum.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspects relates to a method of wireless communication at a user equipment (UE). The method includes receiving an indication of available frequency resources, receiving direction information, determining one or more communication directions for each of the available frequency resources based on the direction information, and communicating with a base station using the available frequency resources based on the determined one or more communication directions for each of the available frequency resources.

A second aspect relates to an apparatus for wireless communication. The apparatus includes a processor, a memory coupled with the processor, and instructions stored in the memory. The instructions are executable by the processor to cause the apparatus to receive an indication of available frequency resources, receive direction information, determine one or more communication directions for each of the available frequency resources based on the direction information, and communicate with a base station using the available frequency resources based on the determined one or more communication directions for each of the available frequency resources.

A third aspect relates to an apparatus for wireless communication at a user equipment (UE). The apparatus includes means for receiving an indication of available frequency resources, means for receiving direction information, means for determining one or more communication directions for each of the available frequency resources based on the direction information, and means for communicating with a base station using the available frequency resources based on the determined one or more communication directions for each of the available frequency resources.

A fourth aspect relates to a method of wireless communication at a base station. The method includes determining available frequency resources from among multiple frequency resources, generating an indication of the available frequency resources, transmitting the indication of the available frequency resources and direction information to a user equipment (UE), and communicating with the UE using the available frequency resources based on the direction information.

A fifth aspect relates to an apparatus for wireless communication. The apparatus includes processor, a memory coupled with the processor, and instructions stored in the memory. The instructions are executable by the processor to cause the apparatus to determine available frequency resources from among multiple frequency resources, generate an indication of the available frequency resources, transmit the indication of the available frequency resources and direction information to a user equipment (UE), and communicate with the UE using the available frequency resources based on the direction information.

A sixth aspect relates an apparatus for wireless communication at a base station. The apparatus includes means for determining available frequency resources from among multiple frequency resources, means for generating an indication of the available frequency resources, means for transmitting the indication of the available frequency resources and direction information to a user equipment (UE), and means for communicating with the UE using the available frequency resources based on the direction information.

To the accomplishment of the foregoing and related ends, the one or more implementations include the features hereinafter fully described and particularly pointed out in the claims. The following description and the annexed drawings set forth in detail certain illustrative aspects of the one or

BRIEF DESCRIPTION OF THE DRAWINGS

FIG. 3A illustrates an exemplary frequency allocation for full duplex according to certain aspects of the present disclosure.

FIG. 3B illustrates another exemplary frequency allocation for full duplex according to certain aspects of the present disclosure.

FIG. 8 illustrates an example of frequency resources shared by multiple wireless systems according to certain aspects of the present disclosure.

FIG. 9 illustrates an example of resource block (RB) sets corresponding to the frequency resources in FIG. 8 according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
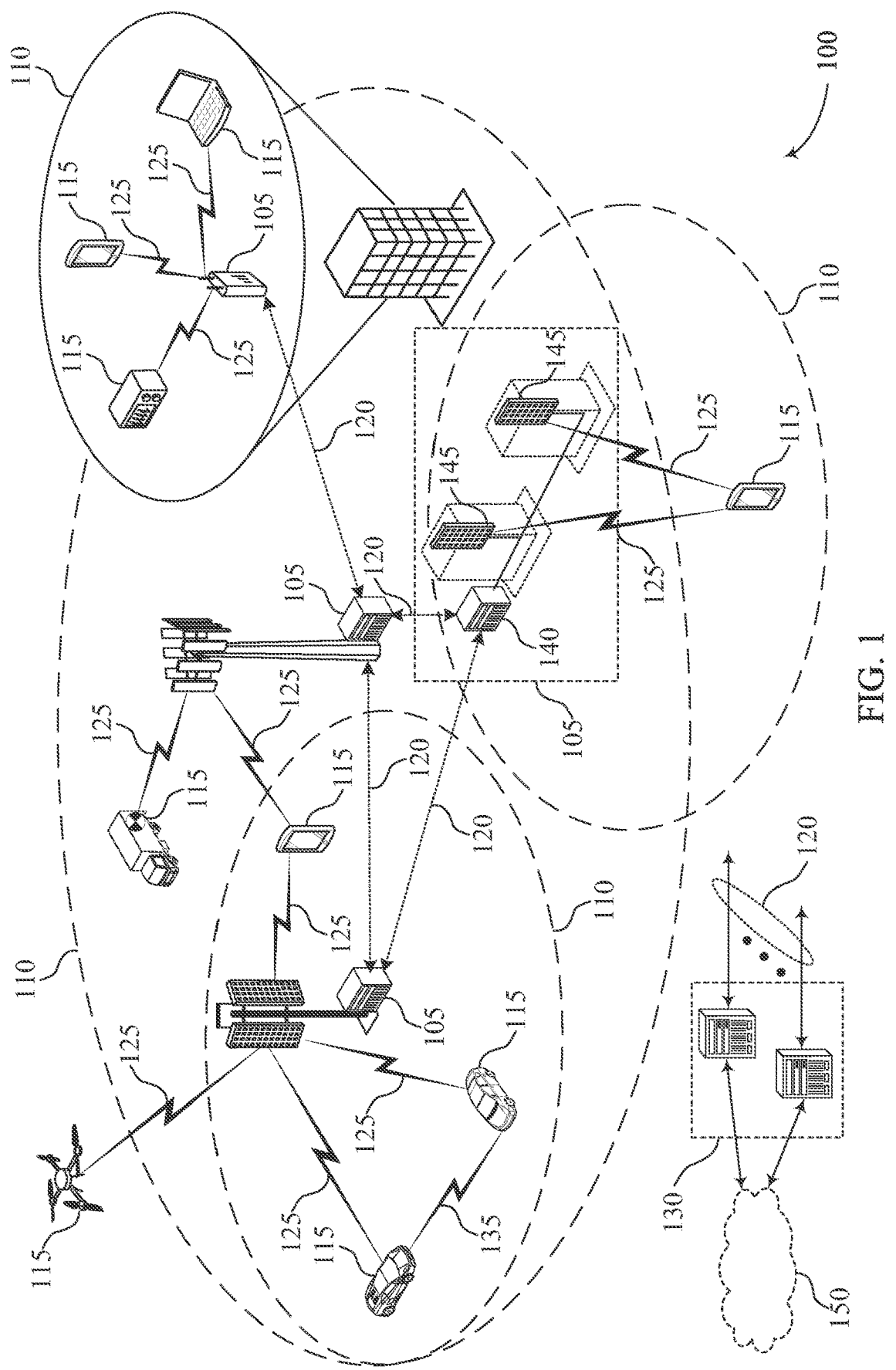
FIG. 1 illustrates an example of a wireless communications system according to certain aspects of the present disclosure.

FIG. 1 illustrates an example of a wireless communications system 100 in which aspects of the present disclosure may be performed. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each one of the access network transmission entities 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support communications for signaling resource allocations for full-duplex slots allocated for communications at a UE 115. In particular, a UE 115 may receive, from a base station 105, a configuration for interpreting resource format indicators indicating resource formats (e.g., uplink format, downlink format, flexible format, full-duplex format) for time periods (e.g., slots) of communication resources allocated to the UE 115. The base station 105 may indicate the configuration for interpreting resource format indicators via radio resource control (RRC) signaling, control messages, configuration messages, or any combination thereof. The UE 115 may additionally receive a control message (e.g., downlink control information (DCI)) from the base station 105, where the control message includes a resource format indicator for one or more time periods. Based on the configuration and the resource format indicator, the UE 115 may determine a resource format (e.g., uplink format, downlink format, flexible format, and full-duplex format) for each time period, and may further determine a frequency resource allocation for each time period including symbols having a full-duplex format.

For the purposes of the present disclosure, the term "time periods" may be used to refer to any period of time resources allocated for wireless communications. In this regard, the term "time period" may be used interchangeably with the term "slot." However this is not to be regarded as a limitation of the present disclosure. Moreover, the term "resource format indicators" may refer to any indication, index, table, or storage object which is used to indicate resource formats (e.g., uplink format, downlink format, flexible format, full-duplex format) for slots of resources allocated to a UE 115. In this regard, a resource format indicator may include, but is not limited to, a slot format indicator (SFI).

By way of example, a base station 105 may transmit a downlink transmission including an indication of a configuration for interpreting resource format indicators allocated to the UE 115. In some aspects, configurations for interpreting resource format indicators which are received and identified by UEs 115 may cause different UEs 115 to interpret the same resource format indicator differently. For example, a resource format indicator indicating an index of "1" may be interpreted differently by a first UE 115-a and a second UE 115-b depending on their respective configurations. For instance, the first UE 115-a may interpret the index of "1" as indicating an uplink resource format, whereas the second UE 115-b may interpret the index of "1" as indicating a full-duplex resource format.

Continuing with the same example, the UE 115 may additionally receive a control message (e.g., DCI, group-common DCI (GC-DCI)) including a resource format indicator for a set of slots allocated to the UE 115. Based on the configuration and the resource format indicator, the UE 115 may determine a resource format (e.g., uplink format, downlink format, and full-duplex format) for each slot, and may further determine a frequency resource allocation for each slot including symbols having a full-duplex format. In some aspects, the resource format indicators may be indicated in GC-DCI, thereby enabling each respective UE 115 to interpret the same GC-DCI according to the respective configuration associated with the UE 115.

In some aspects, both resource formats and frequency resource allocations for slots having a full-duplex format may be indicated within different portions (e.g., different bits) of the resource format indicator. In additional or alternative aspects, resource formats may be indicated in the resource format indicator, while frequency resource allocations for slots having a full-duplex format may be indicated in a separate, designated (e.g., reserved) portion of the control message which is reserved for indicating frequency resource allocations. Furthermore, in some aspects, a combined configuration for interpreting resource format indicators may include both a time resource allocation scheme and a frequency resource allocation scheme. In such cases, a UE 115 may utilize the combined configuration to determine both resource formats and frequency resource allocations from a storage object indicated via a resource format indicator (e.g., SFI storage object indicates both resource format and frequency resource allocation).

The techniques described herein may provide for more flexible resource allocations. In particular, techniques described herein may support signaling for full-duplex formats, as well as signaling for frequency resource allocations associated with time periods including symbols having a full-duplex format. Moreover, by sending a single GC-DCI transmission to a group of UEs 115 which indicates resource format indicators (e.g., SFIs), base stations 105 may decrease the control signaling used to communicate resource format indicators, thereby reducing resource and messaging overhead within the wireless communications system 100.

Figure 2:
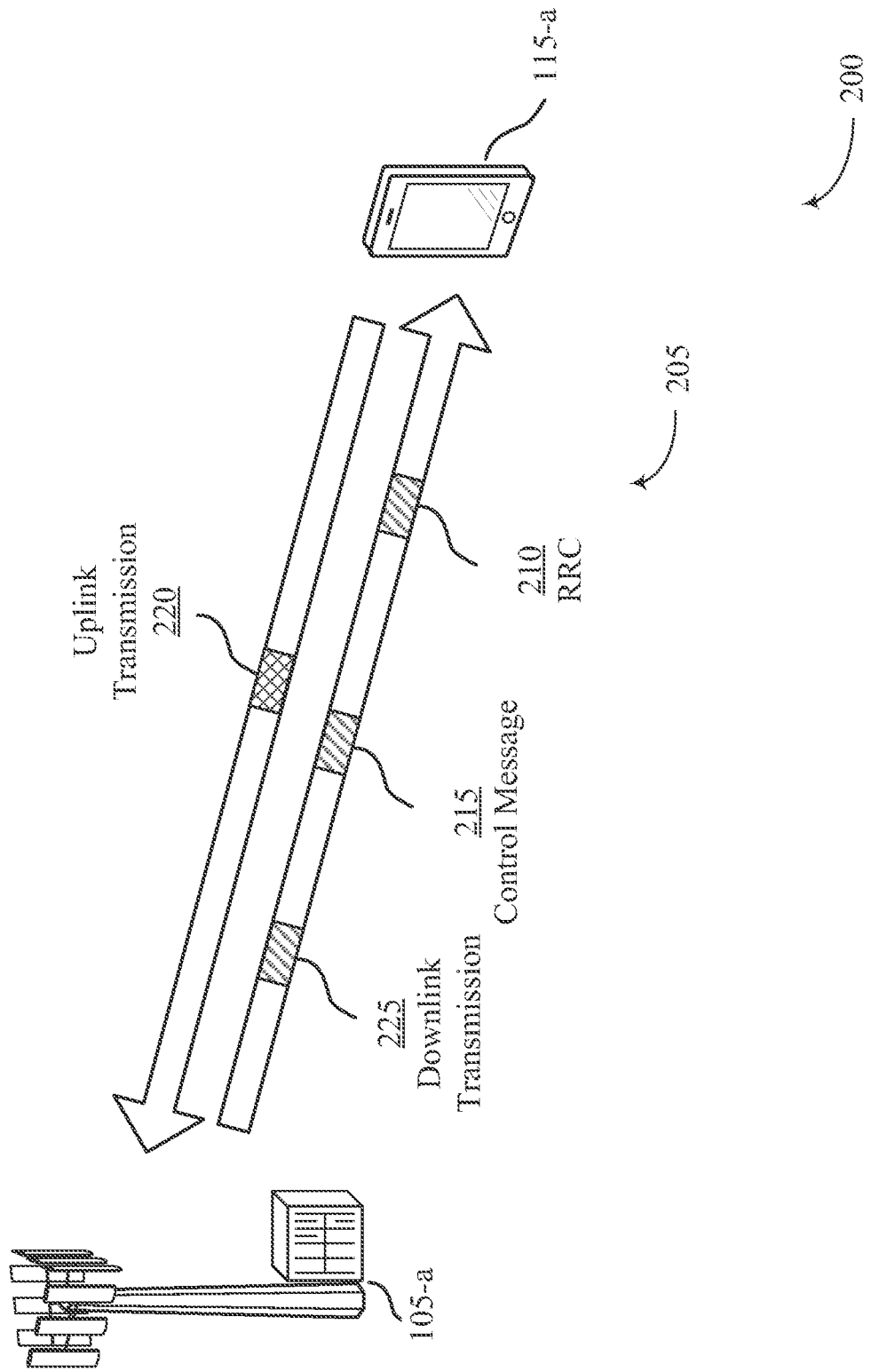
FIG. 2 illustrates an example of communication between a base station and a UE according to certain aspects of the present disclosure.

FIG. 2 illustrates an example of a wireless communications system 200 that supports resource format indicators for full-duplex resource allocation in accordance with aspects of the present disclosure. In some examples, wireless communications system 200 may implement aspects of wireless communications system 100. The wireless communications system 200 may include a UE 115-a and a base station 105-a, which may be examples of UEs 115 and base stations 105, as described with reference to FIG. 1.

The UE 115-a may communicate with the base station 105-a using a communication link 205. In some cases, the communication link 205 may include an example of an access link (e.g., a Uu link). The communication link 205 may include a bi-directional link that can include both uplink and downlink communication. For example, the UE 115-a may transmit uplink transmissions 220, such as uplink control signals or uplink data signals, to the base station 105-a using the communication link 205, and the base station 105-a may transmit downlink transmissions, such as downlink control signals or downlink data signals, to the UE 115-a using the communication link 205.

The UE 115-a and the base station 105-a of the wireless communications system 200 may support communications for signaling resource allocations for full-duplex slots allocated for communications at a UE 115-a. In particular, the UE 115-a may receive, from the base station 105-a, a configuration (e.g., index, table) for interpreting resource format indicators indicating resource formats (e.g., uplink format, downlink format, flexible format, full-duplex format) for time periods (e.g., slots) of communication resources allocated to the UE 115-a. The UE 115-a may additionally receive a control message (e.g., DCI, GC-DCI) from the base station 105, where the control message includes a resource format indicator for one or more time periods. Based on the configuration and the resource format indicator, the UE 115-a may determine a resource format (e.g., uplink format, downlink format, and full-duplex format) for each time period, and may further determine a frequency resource allocation for each time period including symbols having a full-duplex format. The UE 115-a may then transmit uplink transmissions 220 to the base station 105-*a* based on the determined resource formats, the determined frequency resource allocations, or both.

For example, the base station 105-*a* may transmit an RRC message 210 including an indication of a configuration for interpreting resource format indicators (e.g., SFIs) associated with the UE 115-*a*. The resource format indicators may indicate one or more resource formats associated with one or more time periods (e.g., slots) of communication resources allocated to the UE 115-*a*. For example, the one or more resource formats indicated by the resource format indicators may include a downlink format, an uplink format, or a full-duplex format. In some cases, the base station 105-*a* may transmit the RRC message 210 including the indication of the configuration based on a capability of the UE 115-*a* to recognize the full-duplex format.

In additional or alternative aspects, the configuration for interpreting resource format indicators indicated in the RRC message 210 may include a time resource allocation scheme and a frequency resource allocation scheme. In this regard, the configuration indicated to the UE 115-*a* may include a configuration for interpreting both resource formats and frequency resource allocations based on values or storage objects indicated in resource format indicators. In this regard, the configuration for interpreting resource format indicators may include a joint-configuration which is used to determine both time and frequency resources.

In some aspects, the UE 115-*a* may identify the configuration for interpreting resource format indicators. In some aspects, the UE 115-*a* may identify the configuration for interpreting resource format indicators based on receiving the RRC message 210 from the base station 105-*a*. Additionally or alternatively, the UE 115-*a* may be preconfigured with the configuration for interpreting resource format indicators, and may thereby identify the configuration for interpreting resource format indicators without receiving the RRC message 210. In some aspects, the UE 115-*a* may identify the configuration for interpreting resource format indicators based on a capability of the UE 115-*a* to recognize full-duplex formats.

In some aspects, the UE 115-*a* may identify one or more configurations for interpreting resource format indicators. In particular, resource format indicators which indicate varying quantities of slots including symbols having a full-duplex format may be associated with different configurations. For example, in some cases, the UE 115-*a* may identify a first configuration associated with resource format indicators indicating a single time period (e.g., single slot) including a set of symbols having a full-duplex format, and may identify a second configuration associated with resource format indicators indicating a two or more time periods (e.g., single slot) including a set of symbols having a full-duplex format.

In some aspects, the UE 115-*a* may receive a control message 215 from the base station 105-*a*. The control message 215 may include a resource format indicator (e.g., SFI) for one or more time periods (e.g., slots) of communication resources allocated to the UE 115-*a*. The control message 215 may include DCI, GC-DCI, or the like. For example, the control message may include an enhanced DCI (e.g., DCI 2_0, DCI 2_x) which is used to indicate both resource formats (e.g., uplink format, downlink format, full-duplex format) as well as frequency resource allocations for slots including symbols having a full-duplex format. In some aspects, at least one time period (e.g., at least one slot) of the one or more time periods allocated to the UE 115-*a* indicated via the control message 215 may include a time period (e.g., slot) including symbols having a full-duplex format.

As noted previously herein, not all UEs 115 may be compatible with full-duplex communications. Accordingly, in some aspects, UEs 115 which are not configured for full-duplex communications may only receive and monitor for "legacy" control messages (e.g., DCI 2_0) which do not indicate full-duplex slots and/or frequency resource allocations for full-duplex slots, and UEs 115 which are configured for full-duplex communications may receive and monitor for both "legacy" control messages (e.g., DCI 2_0) as well as "enhanced" control messages (e.g., enhanced DCI 2_0, DCI 2_x) which indicate full-duplex slots and/or frequency resource allocations for full-duplex slots. In this regard, the UE 115-*a* may receive the control message 215 based on a capability of the UE 115-*a* to recognize full-duplex formats. Additionally or alternatively, UEs 115 which are not configured for full-duplex communications may receive enhanced control messages, where resources associated with the UEs 115 within the enhanced control messages may not include indications of full-duplex slots and/or frequency resource allocations for full-duplex slots.

In some cases, UEs 115 which are configured to recognize and communicate with full-duplex slots may be referred to as "full-duplex UEs" or "FD UEs." Comparatively, UEs 115 which are configured to recognize full-duplex slots but are not configured to communicate with full-duplex slots may be referred to as "full-duplex-aware UEs" or "FD-aware UEs," while UEs 115 which are not configured to recognize or communicate with full-duplex slots may be referred to as "non-full-duplex-aware UEs" or "non-FD-aware" UEs. In some aspects, It is further noted herein that configuring each UE 115 with configurations for interpreting resource format indicators separately may allow for UEs 115 of varying complexity or sophistication (e.g., UEs 115 which are and/or are not configured for full-duplex communications) to receive and interpret common control messages (e.g., enhanced control messages) and common resource format indicators. For example, some UEs 115 may not be capable of recognizing full-duplex formats (e.g., non-FD-aware UEs), and may be unable to perform communications via full-duplex formats. However, by separately configuring UEs 115 to interpret control messages 215 and/or resource format indicators, both UEs 115 which are configured for full-duplex communications (e.g., FD UEs) and UEs 115 which are not configured for full-duplex communications (e.g., FD-aware UEs, non-FD aware UEs) may be able to receive and interpret the same control message 215 and/or the same resource format indicators. For example, a first UE 115-*a* may be configured (e.g., capable) for full-duplex communications (e.g., FD UE), while a second UE 115-*b* may not be configured (e.g., not capable) for full-duplex communications (e.g., FD-aware UE). In this example, the first UE 115-*a* may be configured to interpret a resource format indicator of "1" as indicating a slot with a full-duplex format, while the second UE 115-*b* may be configured to interpret the resource format indicator of "1" as indicating a slot with an uplink format.

In some aspects, the UE 115-*a* may identify one or more indexes associated with the UE 115-*a*. The one or more indexes may include indications for the UE 115-*a* to monitor certain portions of the control message 215 which are associated with the UE 115-*a*. In some aspects, the UE 115-*a* may identify the one or more indexes based on the RRC message 210, the control message 215, other signaling from the base station 105-*a*, or any combination thereof. Moreover, the UE 115-*b* may identify the one or more indexes based on a capability of the UE 115-*b* to recognize full-duplex formats.

For example, the first few slots or bits of the control message 215 may include one or more indexes indicating portions of the control message 215 that the UE 115-*a* is to monitor to determine resource allocations. For instance, the UE 115-*a* may identify, within the control message 215, an index associated with the UE 115-*a*, where the index indicates a position of a resource format indicator associated with the UE 115-*a* within the control message 215.

In some aspects, the UE 115-*a* may identify a single index which indicates for the UE 115-*a* to monitor one or more portions of the control message 215. Additionally or alternatively, the UE 115-*a* may identify multiple indexes which indicate for the UE 115-*a* to monitor multiple portions of the control message 215. For example, in some cases, the UE 115-*a* may identify a first index within the control message 215, where the first index indicates for the UE 115-*a* to monitor a first portion of the control message 215. Continuing with the same example, the UE 115-*a* may identify a second index within the control message 215, where the second index indicates for the UE 115-*a* to monitor a second portion of the control message 215 which is different from the first portion. For instance, the first portion of the control message 215 indicated by the first index may include a resource format indicator, and the second portion of the control message indicated by the second index may include a portion of the control message 215 which is reserved for indications of frequency resource allocations for the resource format indicators included within the control message 215.

In some aspects, the UE 115-*a* may identify an index associated with one or more component carriers associated with the UE 115-*a*. For example, the UE 115-*a* may identify an index for each component carrier of a set of component carriers associated with the UE 115-*a*. In this example, each index may indicate a position of a resource format indicator within the control message 215 which is associated with each respective component carrier. In this regard, resource formats and/or frequency resource allocations for full-duplex slots may be indicated separately for each respective component carrier of the UE 115-*a*.

Additionally or alternatively, the UE 115-*a* may identity an index for a first component carrier associated with the UE 115-*a*, where the index for the first component carrier indicates a position of a resource format indicator within the control message 215 which is associated with one or more component carriers associated with the UE 115-*a*. For example, the resource format indicator may be associated with every component carrier associated with the UE 115-*a*. In this regard, an index and/or resource format indicator associated with one component carrier of the UE 115-*a* may be used for additional component carriers of the UE 115-*a*.

The UE 115-*a* may monitor the control message 215, or portions of the control message 215, based on the one or more identified indexes. For example, in cases where the UE 115-*a* identifies a single index indicating a position of a resource format indicator within the control message 215, the UE 115-*a* may monitor the portion of the control message 215 including the resource format indicator based on identifying the index. By way of another example, in cases where the UE 115-*a* identifies a first index indicating a position of a resource format indicator within the control message 215, and a second index indicating a portion of the control message 215 reserved for indications of frequency resource allocations, the UE 115-*a* may monitor portions of the control message 215 including the resource format indicator and the portion of the control message 215 reserved for indications of frequency resource allocations.

In some aspects, the UE 115-*a* may determine a resource format (e.g., uplink format, downlink format, full-duplex format) for each time period (e.g., each slot) of communication resources allocated to the UE 115-*a*. Moreover, the UE 115-*a* may determine a resource format for each time period of communication resources allocated to the UE 115-*a* associated with each component carrier associated with the UE 115-*a*. In this regard, the UE 115-*a* may determine resource formats for each component carrier associated with the UE 115-*a*. In some aspects, the UE 115-*a* may determine the resource formats based on the RRC message 210, the configuration for interpreting resource format indicators, the control message 215 including the resource format indicator, or any combination thereof. For example, the UE 115-*a* may determine a resource format for each time period based on at least a portion of the resource format indicator within the control message 215.

The UE 115-*a* may additionally identify one or more time periods (e.g., slots) including sets of symbols having a full-duplex format. In this regard, the UE 115-*a* may identify one or more slots having a full-duplex format. In some aspects, the UE 115-*a* may identify the one or more time periods including sets of symbols having a full-duplex format based on the RRC message 210, the configuration for interpreting resource format indicators, the control message 215 including the resource format indicator, or any combination thereof.

In some aspects, the UE 115-*a* may monitor the control message 215 for portions of the control message 215 associated with frequency resource allocations of the one or more slots including symbols having a full-duplex format. In this regard, the UE 115-*a* may monitor one or more portions of the control message 215 based on identifying the one or more slots including symbols having a full-duplex format. For example, in cases where the UE 115-*a* identifies one or more slots including symbols having a full-duplex format, the UE 115-*a* may monitor portions of the resource format indicator and/or portions of the control message 215 reserved for indications of frequency resource allocations. By way of another example, in cases where the UE 115-*a* does not identify any slots including symbols having a full-duplex format, the UE 115-*a* may refrain from monitoring portions of the resource format indicator and/or portions of the control message 215 reserved for indications of frequency resource allocations.

In some aspects, the UE 115-*a* may determine a frequency resource allocation for the one or more slots including symbols having a full-duplex format. Moreover, the UE 115-*a* may determine a frequency resource allocation for slots including symbols having a full-duplex format on each component carrier associated with the UE 115-*a*. In some aspects, the UE 115-*a* may determine the frequency resource allocation for the slots including symbols with a full-duplex format based on the RRC message 210, the configuration for interpreting resource format indicators, the control message 215 including the resource format indicator, or any combination thereof. For example, in cases where the UE 115-*a* determines a resource format for each slot based on a first portion (e.g., first bit) of the resource format indicator, the UE 115-*a* may determine the frequency resource allocation based on a second portion (e.g., second bit) of the resource format indicator. By way of another example, the UE 115-*a* may determine the frequency resource allocation based on a portion of the control message 215 reserved for indications of frequency resource allocations for the resource format indicators of the control message 215.

In cases where the UE 115-a identifies two or more slots including sets of symbols with a full-duplex format, the UE 115-a may determine multiple frequency resource allocations. For example, the UE 115-a may identify a first slot including a first set of symbols having a full-duplex format, and a second slot including a second set of symbols having a full-duplex format. In this example, the UE 115-a may determine the resource format for each slot based on a first portion (e.g., first bit) of the resource format indicator, determine a first frequency resource allocation for the first set of symbols having the full-duplex format based on a second portion (e.g., second bit) of the resource format indicator, and determine a second frequency resource allocation for the second set of symbols having the full-duplex format based on a third portion (e.g., third bit) of the resource format indicator. By way of another example, the UE 115-a may determine frequency resource allocations for both the first and second sets of symbols having the full-duplex format based on a portion of the control message 215 reserved for indications of frequency resource allocations.

Moreover, as noted previously herein, the UE 115-a may be configured with multiple configurations for interpreting resource format indicators based on a quantity of slots including symbols having a full-duplex format. In this regard, the UE 115-a may utilize a first configuration to interpret the control message 215 and/or resource format indicator in cases where the UE 115-a identifies a single full-duplex slot, and may utilize a second configuration to interpret the control message 215 and/or resource format indicator in cases where the UE 115-a identifies two or more full-duplex slots.

In some aspects, the UE 115-a may communicate with the base station 105-a based on determining the resource format for each slot and determining the frequency resource allocation for full-duplex slots. For example, the UE 115-a may transmit uplink transmissions 220 to the base station 105-a based on the determined resource formats and frequency resource allocations, and may receive downlink transmissions 225 from the base station 105-a based on the determined resource formats and frequency resource allocations.

The techniques described herein may provide for more flexible resource allocations. In particular, techniques described herein may support signaling for full-duplex formats, as well as signaling for frequency resource allocations associated with time periods including symbols having a full-duplex format. Moreover, by sending a single GC-DCI transmission to a group of UEs 115 which indicates resource format indicators (e.g., SFIs), the base station 105-a may decrease the control signaling used to communicate resource format indicators, thereby reducing resource and messaging overhead within the wireless communications system 200.

The base station 105-a and the UE 115-a may communicate in both directions simultaneously using full duplex. The following two types of full duplex may be used: frequency-division duplex (FDD) and in-band full duplex. In FDD, downlink (DL) and uplink (UL) transmissions occur simultaneously on different frequency resources. In in-band full duplex, DL and UL transmissions occur simultaneously on a shared frequency resource.

The UE 115-a and/or the base station 105-a may employ various techniques to cancel out and/or reduce self-interference to facilitate in-band full duplex. Self-interference occurs when a transmission at a device (e.g., UE 115-a or base station 105-a) interferes with reception at the device on the same frequency. In one approach, the device may employ self-interference cancellation in which the receiver subtracts the known transmitted signal from a signal received at the receiver to cancel out self-interference. In other approaches, self-interference may be reduced by transmitting and receiving signals in different directions, spacing apart transmit and receive antennas on the device, etc.

FIG. 3A shows an example of frequency allocation for FDD according to certain aspects. In the example in FIG. 3A, a first frequency resource 310 (e.g., first frequency band) is allocated for the DL and a second frequency resource 312 (e.g., second frequency band) is allocated for the UL. The first frequency resource 310 and the second frequency resource 312 may be separated by a guard band 315, as shown in FIG. 3A. The guard band 315 may be added, for example, to reduce leakage between the first frequency resource 310 and the second frequency resource 312. However, it is to be appreciated that the present disclosure is not limited to this example, and that the guard band 315 may be omitted in some implementations. For example, for sub-band full duplex, there may be no guard band or a very small guard band between the frequency resources 310 and 312.

It is to be appreciated that a frequency band may also be referred to as a sub-band or a portion of a larger frequency band, a channel, a bandwidth, or another term. A frequency resource may include a frequency band, one or more carriers (e.g., sub carriers), a set of subcarriers, a set of resource blocks (RBs) where each RB in the set of RBs includes a respective set of subcarriers, etc.

Although the first frequency resource 310 and the second frequency resource 312 have approximately the same bandwidth in the example in FIG. 3A, it is to be appreciated that this need not be the case. For example, the first frequency resource 310 and the second frequency resource 312 may have different bandwidths depending, for example, on the UL data traffic and the DL data traffic. In other words, the frequency allocation for UL and DL may be asymmetric.

FIG. 3B shows another example of frequency allocation for FDD in which the frequency resources allocated for the DL and UL are switched with respect to the frequency allocation shown in FIG. A. In this example, a first frequency resource 320 (e.g., first frequency band) is allocated for the UL and a second frequency resource 322 (e.g., second frequency band) is allocated for the DL. In the example in FIG. 3B, the first frequency resource 320 and the second frequency resource 322 are separated by a guard band 325. However, it is to be appreciated that the present disclosure is not limited to this example, and that the guard band 325 may be omitted in some implementations. For example, for sub-band full duplex, there may be no guard band or a very small guard band between the frequency resources 320 and 322.

Figure 3D:
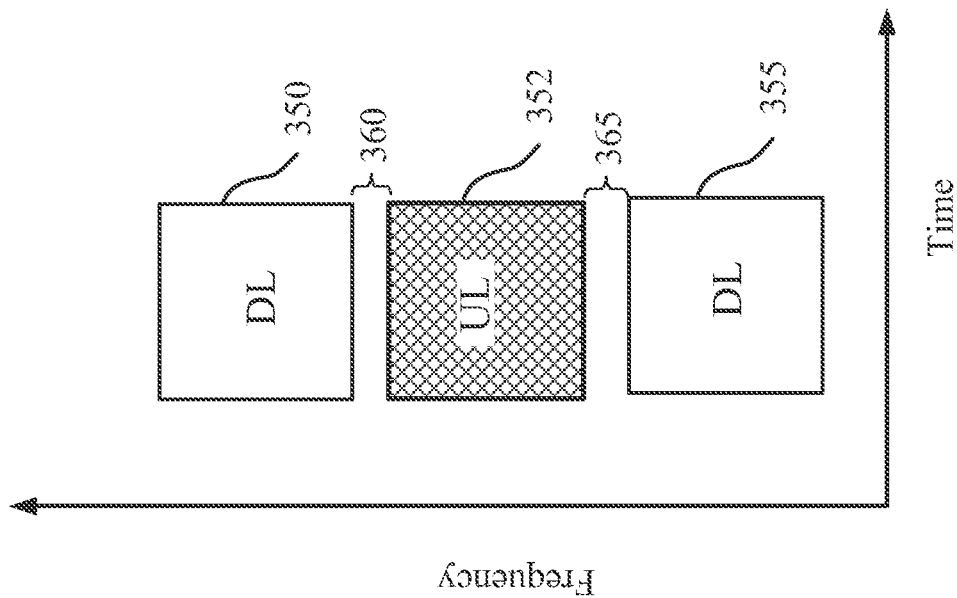
FIG. 3D illustrates another exemplary frequency allocation for full duplex according to certain aspects of the present disclosure.
Figure 3C:
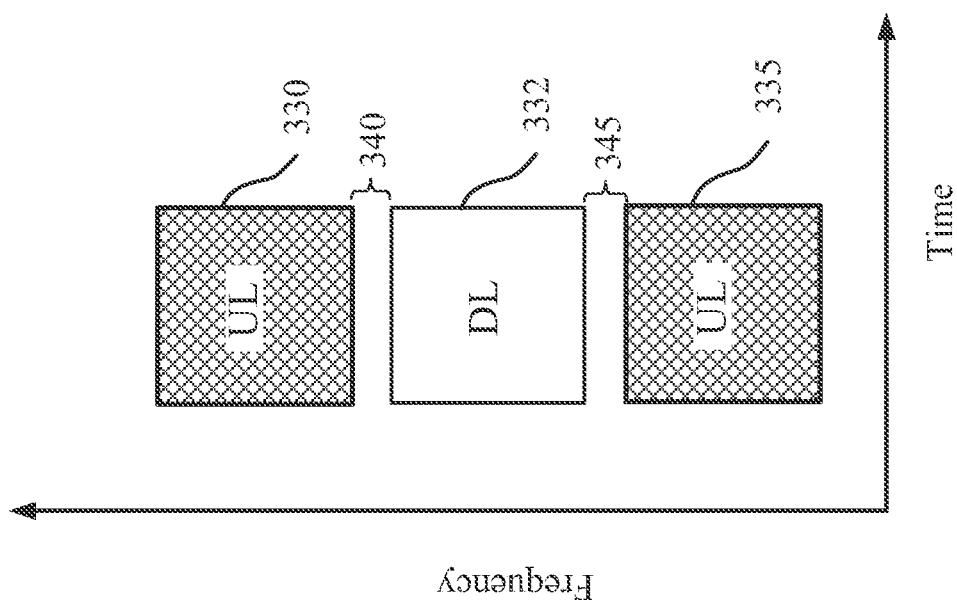
FIG. 3C illustrates another exemplary frequency allocation for full duplex according to certain aspects of the present disclosure.

FIG. 3C shows another example of frequency allocation for FDD according to certain aspects. In the example in FIG. 3C, a first frequency resource 330 (e.g., first frequency band) is allocated for the UL, a second frequency resource 332 (e.g., second frequency band) is allocated for the DL, and a third frequency resource 335 (e.g., third frequency band) is allocated for the UL. The first frequency resource 330 and the second frequency resource 332 may be separated by a first guard band 340, and the second frequency resource 332 and the third frequency resource 335 may be separated by a second guard band 345, as shown in FIG. 3C. However, it is to be appreciated that the present disclosure is not limited to this example, and that the guard bands 340 and 345 may be omitted in some implementations. For example, for sub-band full duplex, there may be no guard bands or very small guard bands between the frequency resources 330, 332, and 335.

FIG. 3D shows another example of frequency allocation for FDD according to certain aspects. In the example in FIG. 3D, a first frequency resource 350 (e.g., first frequency band) is allocated for the DL, a second frequency resource 352 (e.g., second frequency band) is allocated for the UL, and a third frequency resource 355 (e.g., third frequency band) is allocated for the DL. The first frequency resource 350 and the second frequency resource 352 may be separated by a first guard band 360, and the second frequency resource 352 and the third frequency resource 355 may be separated by a second guard band 365, as shown in FIG. 3D. However, it is to be appreciated that the present disclosure is not limited to this example, and that the guard bands 360 and 365 may be omitted in some implementations. For example, for sub-band full duplex, there may be no guard bands or very small guard bands between the frequency resources 350, 352, and 355.

It is to be appreciated that the present disclosure is not limited to the exemplary frequency allocations for FDD shown in FIGS. 3A to 3D.

Figure 4B:
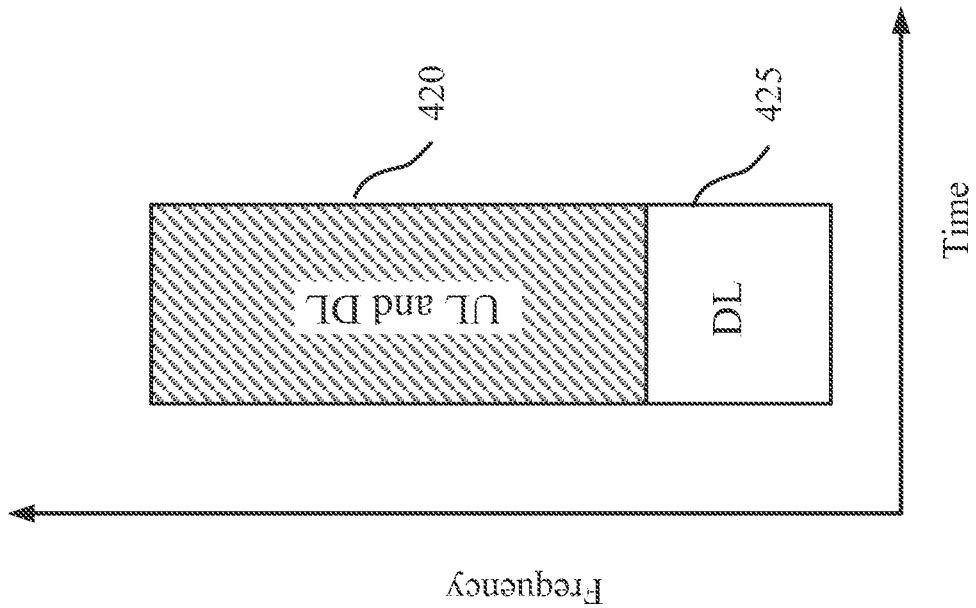
FIG. 4B illustrates another exemplary frequency allocation for in-band full duplex according to certain aspects of the present disclosure.
Figure 4A:
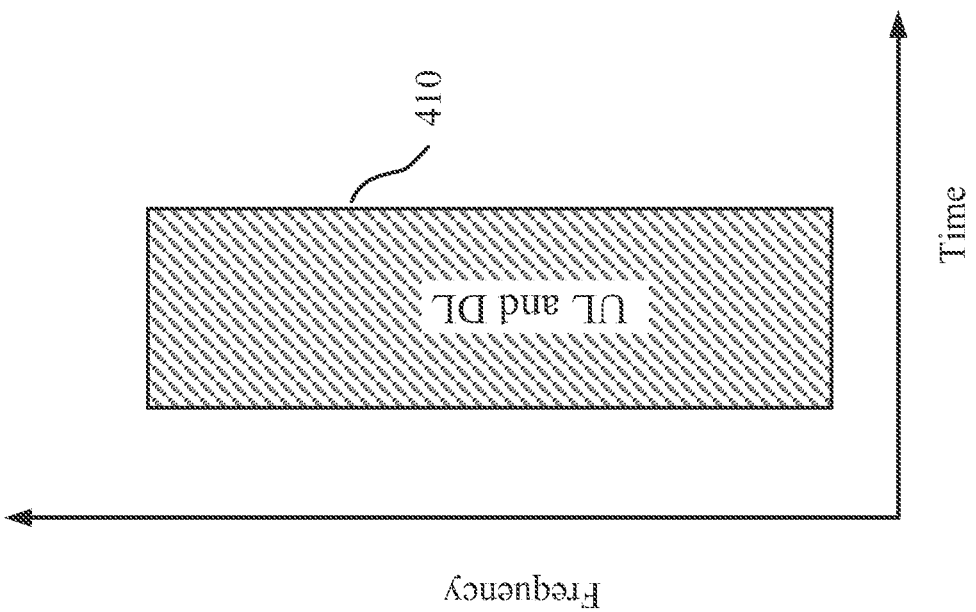
FIG. 4A illustrates an exemplary frequency allocation for in-band full duplex according to certain aspects of the present disclosure.

FIG. 4A shows an example of frequency allocation for in-band full duplex according to certain aspects. In the example in FIG. 4A, a frequency resource 410 (e.g., frequency band) is allocated for both the DL and UL (i.e., in-band full duplex). The in-band full duplex increases spectral efficiency by allocating the same frequency resource for both DL and UL.

FIG. 4B shows another example of frequency allocation for in-band full duplex according to certain aspects. In the example in FIG. 4B, a first frequency resource 420 (e.g., first frequency band) is allocated for both the DL and UL (i.e., in-band full duplex), and a second frequency resource 425 (e.g., second frequency band) is allocated for DL. Thus, in this example, the DL and UL share the first frequency resource 420. Although a guard band is not shown in FIG. 4B, it is to be appreciated that there may be a guard band between the first frequency resource 420 and the second frequency resource 425.

Figure 4D:
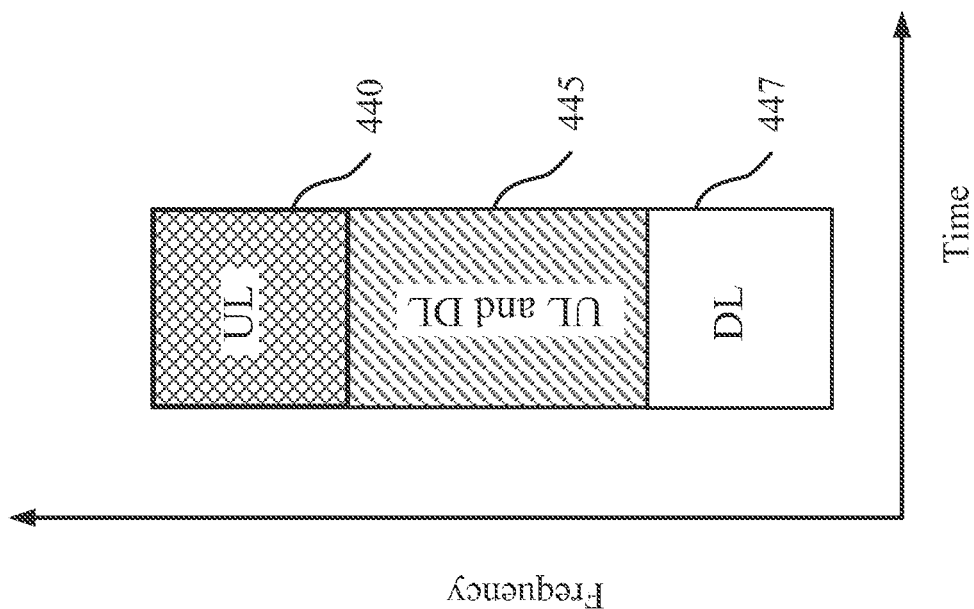
FIG. 4D illustrates another exemplary frequency allocation for in-band full duplex according to certain aspects of the present disclosure.
Figure 4C:
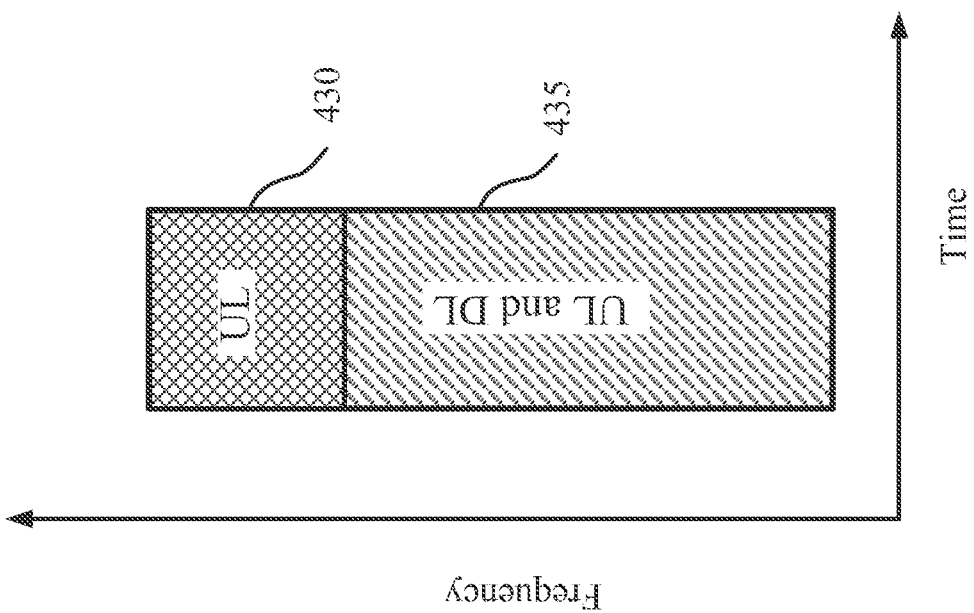
FIG. 4C illustrates another exemplary frequency allocation for in-band full duplex according to certain aspects of the present disclosure.

FIG. 4C shows another example of frequency allocation for in-band full duplex according to certain aspects. In the example in FIG. 4C, a first frequency resource 430 (e.g., first frequency band) is allocated for UL, and a second frequency resource 435 (e.g., second frequency band) is allocated for both UL and DL (i.e., in-band full duplex). Thus, in this example, the DL and UL share the second frequency resource 435. Although a guard band is not shown in FIG. 4C, it is to be appreciated that there may be a guard band between the first frequency resource 430 and the second frequency resource 435.

FIG. 4D shows another example of frequency allocation for in-band full duplex according to certain aspects. In the example in FIG. 4D, a first frequency resource 440 (e.g., first frequency band) is allocated for UL, a second frequency resource 445 (e.g., second frequency band) is allocated for both UL and DL (i.e., in-band full duplex), and a third frequency resource 447 (e.g., third frequency band) is allocated for DL. Thus, in this example, the DL and UL share the second frequency resource 445. Although guard bands are not shown in FIG. 4D, it is to be appreciated that there may be a guard band between the first frequency resource 440 and the second frequency resource 445 and/or a guard band between the second frequency resource 445 and the third frequency resource 447.

It is to be appreciated that the present disclosure is not limited to the exemplary frequency allocations for in-band full duplex shown in FIGS. 4A to 4D.

Figure 5:
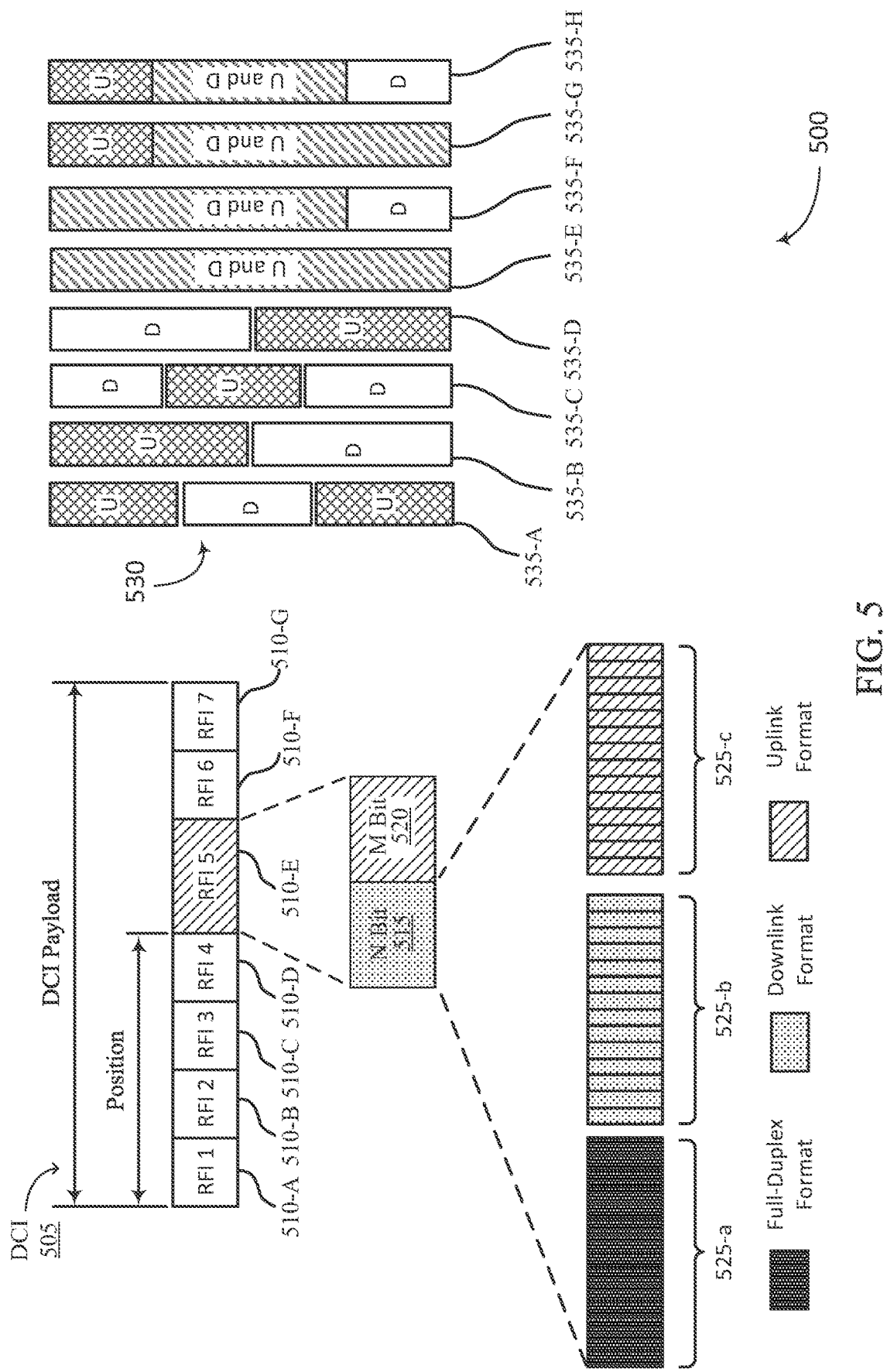
FIG. 5 illustrates an example of a resource allocation scheme that supports resource format indicators for full-duplex resource allocation according to certain aspects of the present disclosure.

FIG. 5 illustrates an example of a resource allocation scheme 500 that supports resource format indicators for full-duplex resource allocation in accordance with aspects of the present disclosure.

In certain aspects, the UE 115-a may receive a control message 505 (e.g., downlink control indicator (DCI)) including one or more resource format indicators 510 (e.g., slot format indicators (SFIs)). For the example where the control message includes a DCI, the DCI may include an enhanced DCI 2_0, DCI 2_x, etc. As shown in the example in FIG. 5, the UE 115-a may receive the control message 505 (e.g., from the base station 105-a), where the control message 505 includes a set of resource format indicators 510-A to 510-G for a group of UEs including the UE 115-a. In some aspects, the UE 115-a may identify a position indicator (e.g., one or more indexes) associated with the UE 115-a, where the position indicator indicates a position of a resource format indicator in the control message 505 associated with the UE 115-a (e.g., one of the resource format indicators 510-A to 510-G). In some cases, the position indicator may be received via an RRC message 210, within a bit field of the control message 505, or any combination thereof. For example, in some cases, the UE 115-a may identify the position indicator (e.g., an index) in a bit field of the control message 505, where the position indicates the position of the resource format indicator 510-E associated with the UE 115-a. The control message 505 and/or RRC message 210 may be transmitted from the base station 105-a (e.g., gNB) to the UE 115-a.

The resource format indicator 510-E may be associated with one or more time periods (e.g., slots 525) of communication resources allocated to the UE 115-a. For example, as shown in FIG. 5, the resource format indicator 510-E may be associated with a first slot 525-a, a second slot 525-b, and a third slot 525-c. In the example in FIG. 5, each of the slots 525-a to 525-c includes 14 symbols represented as rectangles. However, it is to be appreciated that the slots 525-a to 525-c are not limited to this example. In some aspects, the UE 115-a may monitor the resource format indicator 510-E based on the position in the control message 505 indicated by the position indicator. The resource format indicator 510-E may include a first portion 515 (e.g., "N bit") and a second portion 520 (e.g., "M bit").

In some aspects, the first portion 515 of the resource format indicator 510-E may indicate a resource format for each slot 525-a to 525-c associated with the resource format indicator 510-E. For example, as shown in FIG. 5, the first portion 515 of the resource format indicator 510-E may indicate a full-duplex format associated with the first slot 525-a, a downlink format associated with the second slot 525-b, and an uplink format associated with the third slot 525-c. In this regard, the UE 115-a may determine a resource format for each time period (e.g., each slot 525) based on the first portion 515 of the resource format indicator 510-E. It is to be appreciated that the present disclosure is not limited to the exemplary formats shown in FIG. 5, and that the first portion 515 of the resource format indicator 510-E may indicate other combinations of formats for the slots 525-a to 525-c, and may indicate formats for a different number of slots.

In some aspects, the UE 115-a may identify a slot including symbols having a full-duplex format based on the first portion 515 of the resource format indicator 510-E. In the example in FIG. 5, the first portion 515 of the resource format indicator 510-E indicates a full-duplex format for slot 525-a. Thus, in this example, the UE 115-a identifies the slot 525-a as having a full-duplex format based on the first portion 515 of the resource format indicator 510-E. However, it is to be appreciated that the present disclosure is not limited to this example. For example, the first portion 515 may indicate a full-duplex format for another slot and/or a full-duplex format for more than one slot.

After identifying the slot 525-a as having a full-duplex format, the UE 115-a may monitor the second portion 520 of the resource format indicator 510-E to determine a frequency allocation 530 for the slot 525-a. In some aspects, the second portion 520 of the resource format indicator 510-E may indicate a frequency allocation 530 for a full-duplex slot (e.g., slot 525-a) by indicating one or more frequency formats for the full-duplex slot. For example, the second portion 520 of the resource format indicator 510-E may indicate the frequency allocation 530 for the full-duplex slot by indicating one or more of the exemplary frequency formats 535-A to 535-H shown in FIG. 5. Each frequency format 535-A to 535-H allocates (i.e., assigns) a communication direction (e.g., UL direction, DL direction, or in-band full duplex) to each one of one or more frequency resources. Note that, in FIG. 5, frequency is in the vertical direction.

In the example shown in FIG. 5, the exemplary frequency formats 535-A to 535-D include a first frequency format 535-A corresponding to the exemplary frequency allocation in FIG. 3C, a second frequency format 535-B corresponding to the exemplary frequency allocation in FIG. 3B, a third frequency format 535-C corresponding to the exemplary frequency allocation in FIG. 3D, and a fourth frequency format 535-D corresponding to the exemplary frequency allocation in FIG. 3A. In this example, each frequency format indicates one or more frequency resources (e.g., one or more frequency bands) and a communication direction for each frequency resource (e.g., frequency band). In FIG. 5, the UL direction is labeled "U" and the DL direction is labeled "D." The DL direction is from a base station (e.g., the base station 105-a) to the UE 115-a, and the UL direction is from the UE 115-a to a base station (e.g., the base station 105-a). Although guard bands are shown separating the frequency resources in the example in FIG. 5, it is to be appreciated that the present disclosure is not limited to this example. For example, for sub-band full duplex, there may be no guard bands or very small guard bands between the frequency resources.

To support in-band full duplex communications, the exemplary frequency formats 535-E to 535-H include a fifth frequency format 535-E corresponding to the exemplary frequency allocation in FIG. 4A, a sixth frequency format 535-F corresponding to the exemplary frequency allocation in FIG. 4B, a seventh frequency format 535-G corresponding to the exemplary frequency allocation in FIG. 4C, and an eighth frequency format 535-H corresponding to the exemplary frequency allocation in FIG. 4D. In this example, each frequency format indicates one or more frequency resources (e.g., frequency bands) and a communication direction for each frequency resource (e.g., frequency band). In FIG. 5, the in-band full duplex direction is labeled "U and D." It is to be appreciated that the frequency allocation 530 is not limited to the exemplary frequency formats shown in FIG. 5.

In some aspects, each of the exemplary frequency formats 535-A to 535-H may be identified by a respective format index, and the second portion 520 of the resource format indicator 510-E may indicate one of the frequency formats by including the respective format index. Thus, in this example, the UE 115-a may determine a frequency allocation 530 for the slot 525-a by determining the frequency format (e.g., one of the frequency formats 535-A to 535-H) corresponding to the format index in the second portion 520 of the resource format indicator 510-E.

For the example where the second portion 520 indicates one of the exemplary frequency formats 535-A to 535-H for a full-duplex slot (e.g., slot 525-a), the UE 115-a may use the indicated frequency format for each symbol in the full-duplex slot. For an example where the first portion 515 of the resource format indicator 510-E indicates two or more full-duplex slots, the UE 115-a may use the indicated frequency format for each symbol in each of the full-duplex slots.

In one example, the first portion 515 of the resource format indicator 510-E may indicate two or more full-duplex slots. In this example, the second portion 520 may indicate two or more frequency formats, in which each of the indicated frequency formats corresponds to a respective one of the full-duplex slots indicated in the first portion 515. In this example, the UE 115-a may determine the two or more full-duplex slots based on the first portion 515 of the resource format indicator 510-E. For each of the determined full-duplex slots, the UE 115-a may use the respective frequency format indicated for the slot in the second portion 520 of the resource format indicator 510-E.

Figure 6:
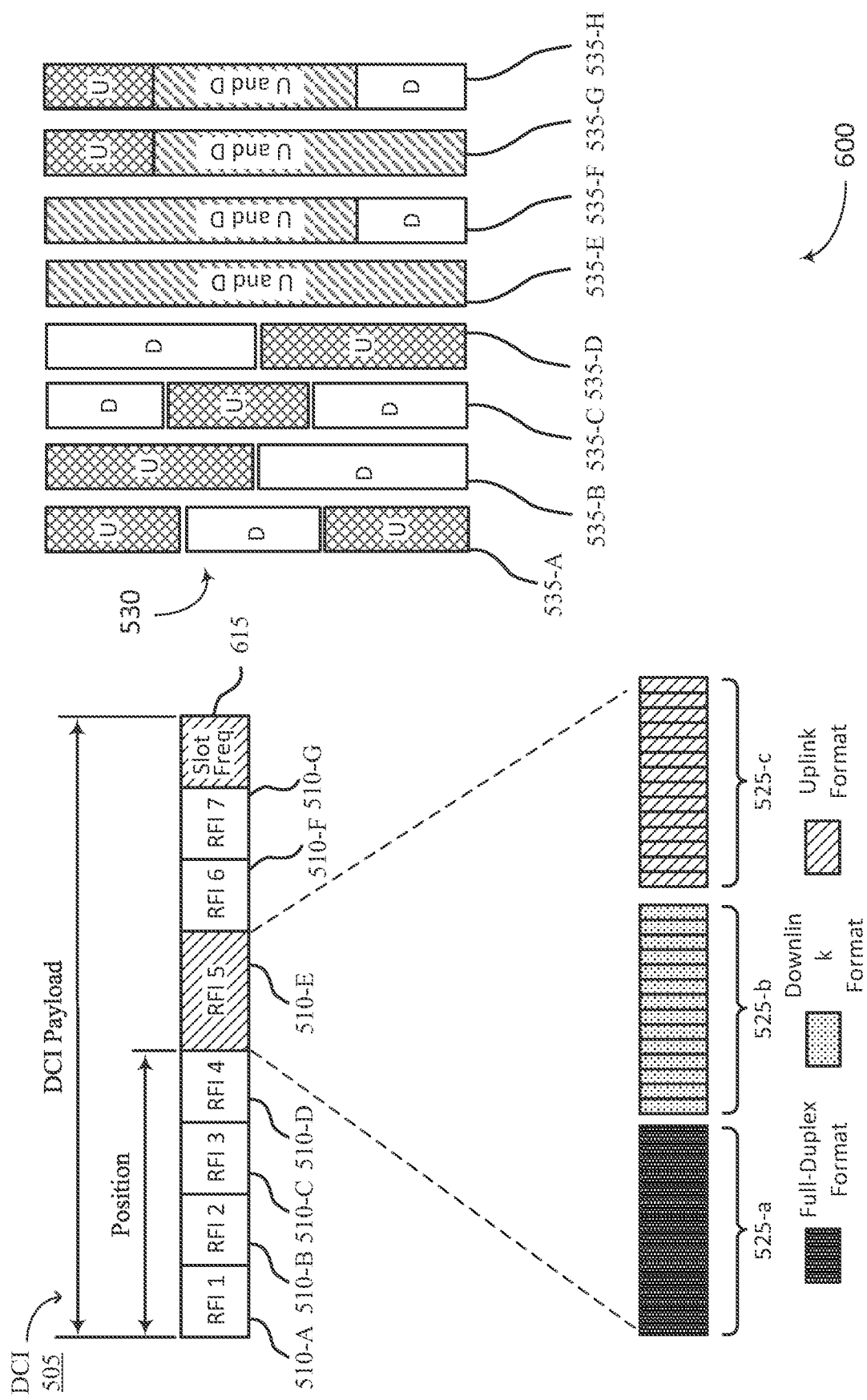
FIG. 6 illustrates another example of a resource allocation scheme that supports resource format indicators for full-duplex resource allocation according to certain aspects of the present disclosure.

FIG. 6 illustrates another example of a resource allocation scheme 600 that supports resource format indicators for full-duplex resource allocation in accordance with aspects of the present disclosure. As compared to the resource allocation scheme 500 in which both resource formats and frequency allocations are indicated via portions of the resource format indicator 510-E, the resource allocation scheme 600 may indicate frequency allocations via a reserved portion 615 of the control message 505 (e.g., DCI) which is reserved for indications of frequency allocations for the set of resource format indicators 510 in the control message 505. In this regard, the resource allocation scheme 600 may indicate resource formats via resource format indicators 510, and may indicate frequency allocations for full-duplex slots 525 via the reserved portion 615.

In this example, when the UE 115-a identifies a full-duplex slot (e.g., slot 525-a) associated with the UE 115-a based on the resource format indicator 510-E, the UE 115-a monitors the reserved portion 615 for the frequency allocation for the full-duplex slot. The reserved portion 615 may indicate the frequency allocation 530 for the full-duplex slot by indicating one of the exemplary frequency formats 535-A to 535-H. The UE 115-a may then determine the frequency allocation 530 for the full-duplex slot based on the frequency format indicated in the reserved portion 615.

As discussed above, the control message 505 may allocate frequency resources for in-band full duplex communications in a full-duplex slot (e.g., slot 525-a) by indicating an in-band full duplex frequency format (e.g., one of the exemplary frequency formats 535-E to 535-H). The frequency format may be indicated in the second portion 520 of the resource format indicator 510-E or the reserved portion 615, as discussed above.

In some aspects, the control message 505 may indicate frequency allocations for in-band full duplex communications for a full-duplex slot (e.g., slot 525-a) by indicating two frequency formats for the slot. In this example, the UE 115-a may determine the frequency allocation for the full-duplex slot by combining the two frequency formats to obtain a new frequency format as follows. For a frequency resource (e.g., frequency band) in which both frequency formats indicate the UL direction, the UE 115-*a* assigns the UL direction to the frequency resource (e.g., frequency band). For a frequency resource (e.g., frequency band) in which both frequency formats indicate the DL direction, the UE 115-*a* assigns the DL direction to the frequency resource (e.g., frequency band). For a frequency resource (e.g., frequency band) in which one of the frequency formats indicates the UL direction and the other one of the frequency formats indicates the DL direction, the UE 115-*a* assigns the in-band full duplex direction (i.e., both UL and DL directions) to the frequency resource (e.g., frequency band). In other words, the UE 115-*a* assigns the in-band duplex direction to a frequency resource (e.g., frequency band) where the UL direction in one of the frequency formats overlaps the DL direction in the other one of the frequency formats.

Figure 7:
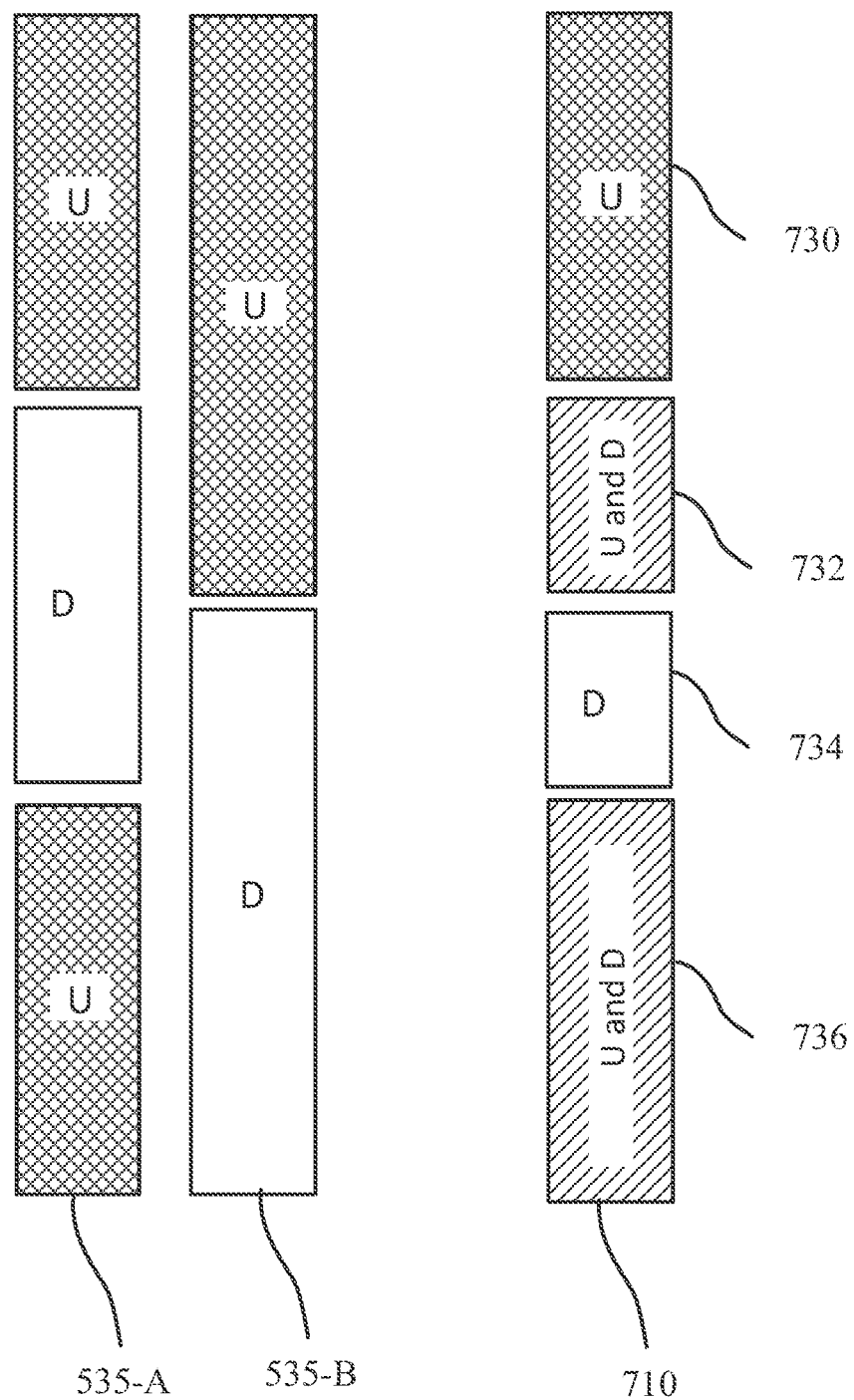
FIG. 7 illustrates an example of combining two frequency formats to obtain a new frequency format according to certain aspects of the present disclosure.

An example of the above approach is illustrated in FIG. 7. In this example, the control message 505 indicates exemplary frequency formats 535-A and 535-B for the full-duplex slot 525-*a* (e.g., in the second portion 520 of the resource format indicator 510-E or the reserved portion 615). In this example, the UE 115-*a* may combine the frequency formats 535-A and 535-B to obtain a new frequency format 710 for the full duplex slot 525-*a* as follows. The UE 115-*a* assigns the UL direction to a first frequency resource 730 (e.g., frequency band) in which both frequency formats 535-A and 535-B indicate the UL direction. The UE 115-*a* assigns the in-band full duplex direction to a second frequency resource 732 (e.g., frequency band) in which the frequency format 535-A indicates the DL direction and the frequency format 535-B indicates the UL direction. The second frequency resource 732 is a frequency resource (e.g., frequency band) where the DL direction in the frequency format 535-A overlaps the UL direction in the frequency format 535-B in the frequency domain. The UE 115-*a* assigns the DL direction to a third frequency resource 734 (e.g., frequency band) in which both frequency formats 535-A and 535-B indicate the DL direction. The UE 115-*a* assigns the in-band full duplex direction to a fourth frequency resource 736 (e.g., frequency band) in which the frequency format 535-A indicates the UL direction and the frequency format 535-B indicates the DL direction. The fourth frequency resource 736 is a frequency resource (e.g., frequency band) where the UL direction in the frequency format 535-A overlaps the DL direction in the frequency format 535-B in the frequency domain.

Thus, in the example illustrated in FIG. 7, the UE 115-*a* combines two frequency formats 535-A and 535-B to obtain a new frequency format 710. The UE 115-*a* uses the new frequency format 710 to determine the frequency allocation for the full duplex slot (e.g., 525-*a*). In this example, the frequency formats 535-A and 535-B are FDD frequency formats. Thus, the UE 115-*a* may combine two FDD frequency formats to obtain a new in-band full duplex frequency format for the full duplex slot (e.g., slot 525-*a*).

The base station 105-*a* (e.g., gNB) and the UE 115-*a* in the wireless communications system 100 or 200 (e.g., NR system) may communicate with each other in a spectrum (e.g., unlicensed spectrum) that is shared with devices in another wireless system (e.g., WiFi system). For example, the wireless communications system 100 or 200 may be an NR wireless system that coexists with a WiFi wireless system in a 5 GHz and 6 GHz band. To avoid interfering with devices in the other wireless system, the base station 105-*a* may sense the spectrum (e.g., in a listen-before-talk (LBT) procedure) to determine which portions of the spectrum (e.g., frequency bands in the spectrum) are available (e.g., unoccupied). The base station 105-*a* may then transmit a control message (e.g., control message 505) to the UE 115-*a* indicating one or more available portions of the spectrum. The base station 105-*a* and the UE 115-*a* may then communicate with each other using the one or more available portions of the spectrum.

In some aspects, the wireless communications system 100 or 200 may share frequency resources with the other wireless system (e.g., WiFi system) in the spectrum (e.g., unlicensed spectrum). Each frequency resource may also be referred to as a unit, a channel, a sub-band, an LBT bandwidth, or another term. FIG. 8 shows an example of frequency resources 810-A to 810-D (e.g., frequency bands) that may be shared by the wireless systems. It is to be appreciated that the present disclosure is not limited to the exemplary number of frequency resources 810-A to 810-D shown in the example in FIG. 8. In one example, each frequency resource may be approximately 20 MHz (e.g., for a WiFi system). However, it is to be appreciated that the present disclosure is not limited to this example.

To avoid interfering with devices in the other wireless system, the base station 105-*a* may sense the shared spectrum to determine which frequency resources 810-A to 810-D (e.g., frequency bands) are available (e.g., unoccupied). In this regard, the base station 105-*a* may detect energy in each of the frequency resources 810-A to 810-D (e.g., LBT bandwidths) using one or more antennas. For each frequency resource, the base station 105-*a* may compare the detected energy for the frequency resource with a threshold (e.g., energy detection (ED) threshold). If the detected energy for a frequency resource is equal to or above the threshold, then the base station 105-*a* may determine that the frequency resource is not available (e.g., occupied). If the detected energy for a frequency resource is below the threshold, then the base station 105-*a* may determine that the frequency resource is available (e.g., unoccupied). After determining the available frequency resources (e.g., LBT bandwidths), the base station 105-*a* may transmit a control message (e.g., control message 505) to the UE 115-*a* indicating the available frequency resources.

In some aspects, the base station 105-*a* and the UE 115-*a* may communicate with each other using sets of resource blocks (RBs) where each RB set corresponds to one of the frequency resources 810-*a* to 810-D. In this regard, FIG. 9 shows an example of RB sets 910-A to 910-D labeled RB set 0 to RB set 3. Each of the RB sets 910-A to 910-D corresponds to a respective one of the frequency resources 810-A to 810-D. For example, RB set 910-A corresponds to frequency resource 810-A, RB set 910-B corresponds to frequency resource 810-B, and so on. Each RB in an RB set may include a set of subcarriers (e.g., 12 subcarriers). In some examples, each one of the RB sets 910-A to 910-D may include a hundred or more RBs. The RB sets 910-A to 910-D may be considered frequency resources corresponding to the frequency resources 810-A to 810-D, respectively.

In the example in FIG. 9, the RB sets 910-A to 910-D are separated by guard bands. More particularly, RB sets 910-A and 910-B are separated by guard band 915, RB sets 910-B and 910-C are separated by guard band 920, and RB sets 910-C and 910-D are separated by guard band 930. Guard bands separating RB sets may be referred to as intra-cell guard bands. It is to be appreciated that, in some cases, the guard bands may be zero in size. For example, for sub-band full duplex, there may be no guard bands or very small guard bands between the RB sets 910-A to 910-D. In this example, a very small guard band may be a guard band having a width of ten or fewer RBs.

In this example, the base station 105-a may indicate the available frequency resources in the control message (e.g., control message 505) by indicating the corresponding RB sets as the available frequency resources. For example, if the base station 105-a determines that frequency resources 810-A, 810-B, and 810-D are available and frequency resource 810-C is not available (e.g., occupied), then the base station 105 may indicate in the control message to the UE 115-a that RB sets 910-A, 910-B, and 910-D are available and RB set 910-C is not available.

As discussed above, after determining the available frequency resources (e.g., LBT bandwidths), the base station 105-a may transmit a control message (e.g., control message 505) to the UE 115-a indicating the available frequency resources (e.g., frequency bands). In some aspects, the control message 505 may include an availability bitmap indicating the available frequency resources (e.g., LBT bandwidths). For example, the bitmap may include a bit for each frequency resource in which the logic value of the bit indicates whether the respective frequency resource is available (e.g., unoccupied) or not available (e.g., occupied). For example, a logic value of one may indicate that the corresponding frequency resource is available and a logic value of zero may indicate that the corresponding frequency resource is not available.

In some aspects, the base station 105-a may include a time duration indicator (e.g., channel occupancy time (COT) duration) in the control message 505 indicating a time duration that the available frequency resources indicated in the control message are to be used. In one example, the time duration indicator may indicate the remaining time length for the available frequency resources from the beginning of the slot where the information is received. The interpretation of the time duration indicator may be configured by the RRC message 210.

In some aspects, the base station 105-a may not include a time duration indicator in the control message 505. In these aspects, the UE 115-a may determine the time duration from the resource format indicator 510-E (e.g., SFI). For example, the UE 115-a may assume that the time duration for the available frequency resources is the same as the duration of the slots 525-a to 525-c associated with the resource format indicator 510-E.

Thus, the base station 105-a may indicate the available frequency resources and the time duration for the available frequency resources in the control message 505 (e.g., enhanced DCI 2_0, DCI 2_x).

However, currently, the control message 505 does not indicate a communication direction for each available frequency resource. More particularly, the control message 505 does not indicate whether an available frequency resource is for DL communication, UL communication, or in-band full duplex. Thus, currently, the control message 505 does not provide information about communication direction to facilitate full duplex communications for the available frequency resources.

In some aspects, the base station 105-a sends the base station 105-a direction information indicating the direction of communication (e.g., UL, DL, or in-band full duplex) for each of the frequency resources 810-A to 810-D. The base station 105-a may include the direction information in the control message 505 (e.g., enhanced DCI 2_0, DCI 2_x) or another message. For example, the control message 505 may include an indication of the available frequency resources (e.g., available RB sets), a time duration indicator indicating the time duration for the available frequency resources, and direction information for the available frequency resources.

For the example where each frequency resource 810-A to 810-D corresponds to one of the RB sets 910-A to 910-D, the control message 505 may indicate the available RB sets 910-A to 910-D.

Upon receiving the control message 505, the UE 115-a may determine the available frequency resources based on the indication of the available frequency resources, determine the time duration for the available frequency resources based on the time duration indicator, and determine the direction of communication for each of the available frequency resources based on the direction information. The UE 115-a may then communicate with the base station 105-a during the time duration using the available frequency resources 810-A to 810-D based on the communication directions indicated by the direction information.

Figure 10:
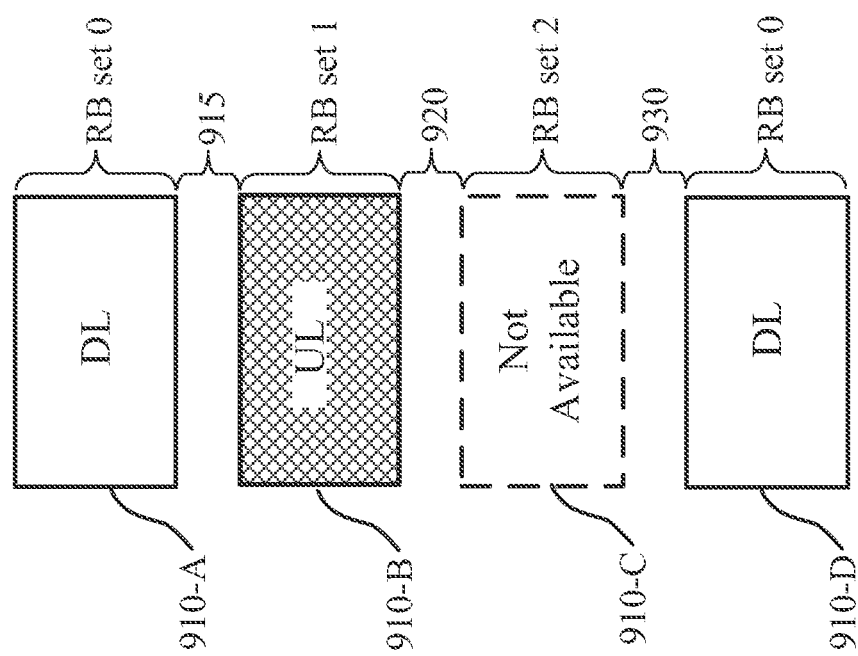
FIG. 10 illustrates an example of assigning communication directions to available frequency resources according to certain aspects of the present disclosure.

In some aspects, the direction information may indicate a communication direction (e.g., DL, UL, or in-band full duplex) for each frequency resource 810-A to 810-D. Based on the direction information, the UE 115-a may determine the communication direction for each available frequency resource. An example of this is illustrated in FIG. 10 for the example in which each frequency resource 810-A to 810-D corresponds to one of the RB sets 910-A to 910-D. In this example, the control message 505 indicates the available frequency resources using an availability bitmap where each bit in the bitmap indicates whether the corresponding frequency resource (e.g., RB set) is available. In this example, the availability bitmap may be [1101] indicating that frequency resources 810-A, 810-B, and 810-D (RB sets 910-A, 910-B, and 910-D) are available and frequency resource 810-C (RB set 910-C) is not available. Also, in this example, the direction information may include a set of indicators (e.g., values) where each indicator indicates the direction of a respective one of the frequency resources. In the example in FIG. 10, the direction information may be [DL UL UL DL] indicating that the direction for frequency resource 810-A (RB set 910-A) is the DL direction, the direction for frequency resource 810-B (RB set 910-B) is the UL direction, the direction for frequency resource 810-C(RB set 910-C) is the UL direction, and the direction for frequency resource 810-D (RB set 910-D) is the DL direction. Since frequency resource 810-C(RB set 910-C) is not available in this example, the UE 115-a may ignore the direction for frequency resource 810-C(RB set 910-C).

In the example illustrated in FIG. 10, the direction information has the same granularity as the frequency resources 810-A to 810-D (RB sets 910-A to 910-D). However, it is to be appreciated that this need not be the case. For example, each frequency resource may include two or more portions in the frequency domain. In this example, for each frequency resource, the direction information may indicate a communication direction for each portion of the frequency resource. The portions for each frequency resource may have the same bandwidth or different bandwidths. For the example where each frequency resource corresponds to an RB set, each portion of the frequency resource may include one or more respective RBs in the RB set. In this example, the direction information has a smaller granularity than the frequency resources 810-A to 810-D (RB sets 910-A to 910-D).

The direction information may also have a larger granularity than the frequency resources 810-A to 810-D (RB sets 910-A to 910-D). For example, the frequency resources 810-A to 810-D (RB sets 910-A to 910-D) may be grouped into groups (e.g., groups of two). In this example, the direction information may indicate a communication direction for each group of frequency resources (RB sets).

In some aspects, the granularity of the direction information may be configurable. For example, the base station 105-*a* may configure the granularity of the direction information by including a granularity indicator in the RRC message 210, the control message 505, or another message to the UE 115-*a*, in which the granularity indicator indicates the granularity of the direction information. The UE 115-*a* may then use the granularity indicator to determine the granularity of the direction information.

In some aspects, the UE 115-*a* may use the frequency format indicated in the control message 505 to determine the communication directions for the available frequency resources. The UE 115-*a* may determine the frequency format from the second portion 520 of the resource format indicator 510-E or the reserved portion 615, as discussed above. The frequency format may be used to determine the communication directions for the available frequency resources because the frequency format carries direction information. More particularly, the frequency format indicates one or more frequency resources and a direction of communication for each frequency resource (e.g., UL, DL, or in-band full duplex). Examples of frequency formats that include direction information include the exemplary frequency formats 535-A to 535-H shown in FIG. 5. As discussed above with reference to FIG. 7, the UE 115-*a* may also combine two frequency formats to obtain a new frequency format. In these aspects, the frequency format may be considered direction information since the frequency format is used to determine communication directions for the available resources in these aspects.

The UE 115-*a* may use the frequency format to determine the communication directions for the available frequency resources by mapping the communication directions in the frequency format to the available frequency resources in the frequency domain. The frequency format may include one of the resource format indicators 510-A to 510-G, a new frequency format obtained by combining frequency formats, or another frequency format.

In some aspects, the UE 115-*a* may map the communication directions in the frequency format to the available frequency resources in the frequency domain such that one communication direction is mapped to each of the available frequency resources. An example of this approach is described below according to aspects of the present disclosure with reference to an example illustrated in FIG. 11. In the example in FIG. 11, the frequency format 535-A is used. However, it is to be appreciated that another frequency format may be used (e.g., depending on the frequency format indicated in the second portion 520 of the resource format indicator 510-E or the reserved portion 615). As discussed above with reference to FIG. 5, a frequency format allocates (i.e., assigns) a communication direction (e.g., UL direction, DL direction, or in-band full duplex) to each one of one or more frequency resources. Note that, in FIG. 11, frequency is in the vertical direction.

Figure 11:
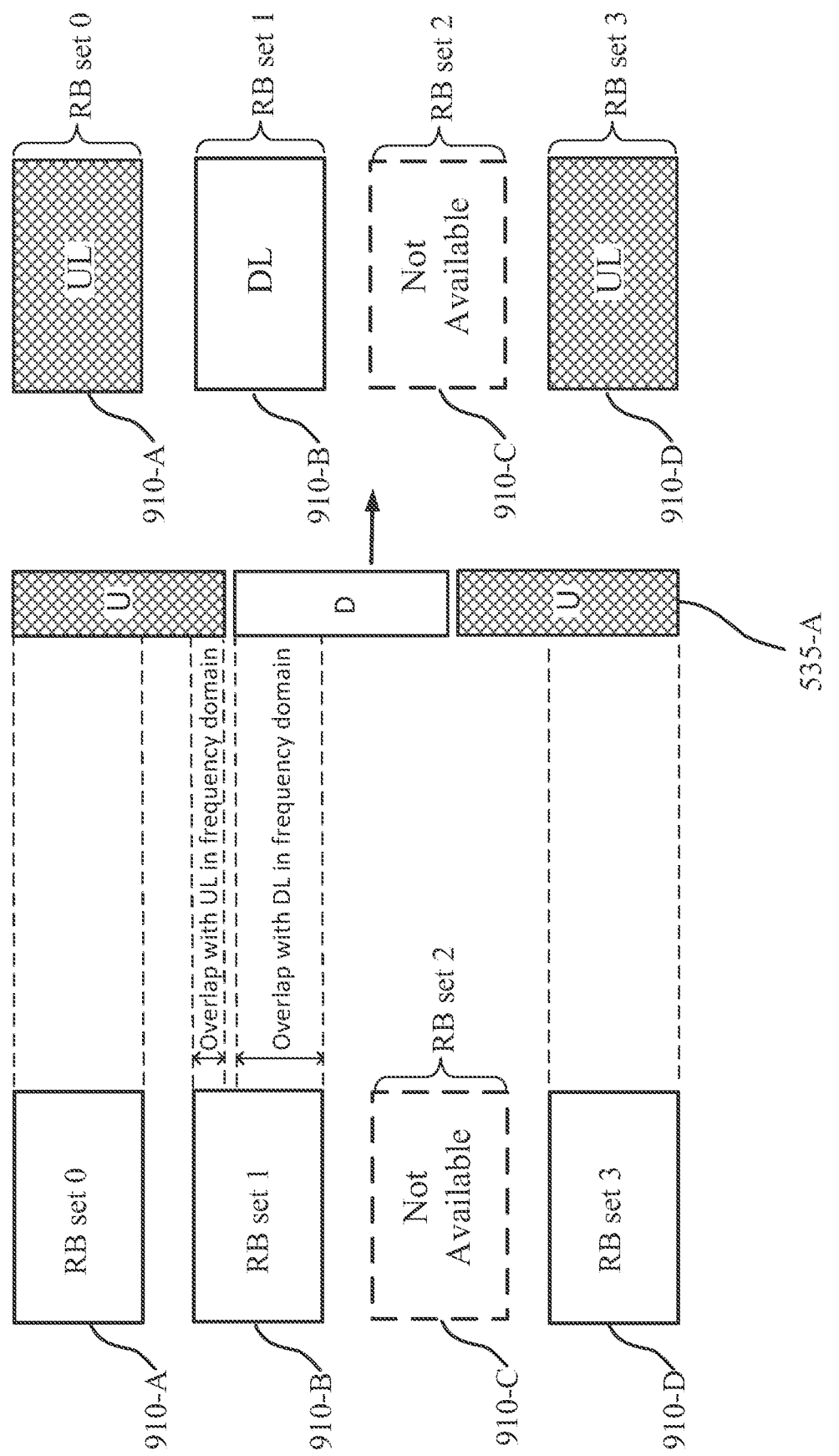
FIG. 11 illustrates an example of mapping communication directions in a frequency format to available frequency resources according to certain aspects of the present disclosure.

In this approach, the UE 115-*a* compares the available frequency resources (RB sets) with the communication directions in the frequency format in the frequency domain. In the example in FIG. 11, the available frequency resources are frequency resources 810-A, 810-B, and 810-D (RB sets 910-A, 910-B, and 910-D). In this approach, if an available frequency resource falls entirely within one communication direction in the frequency format in the frequency domain, then the UE 115-*a* assigns that communication direction to the available frequency resource. For example, in the example in FIG. 11, available frequency resource 810-A (RB set 910-A) falls entirely within the UL direction in the frequency format 535-A in the frequency domain Thus, the UE 115-*a* assigns the UL direction to the frequency resource 810-A (RB set 910-A), as shown in FIG. 11. Similarly, in the example in FIG. 11, available frequency resource 810-D (RB set 910-D) falls entirely within the UL direction in the frequency format 535-A in the frequency domain Thus, the UE 115-*a* assigns the UL direction to the frequency resource 810-D (RB set 910-D), as shown in FIG. 11.

If an available frequency resource overlaps different directions in the frequency format in the frequency domain, then the UE 115-*a* may assign the available frequency resource the direction that overlaps the most with the available frequency resource in the frequency domain. In the example in FIG. 11, the available frequency resource 810-B (RB set 910-B) overlaps with the UL direction and the DL direction in the frequency format 535-A in the frequency domain Since frequency is in the vertical direction in FIG. 11, overlaps in the frequency domain are shown as overlaps in the vertical direction in FIG. 11. In this example, the available frequency resource 810-B (RB set 910-B) overlaps more with the DL direction than the UL direction in the frequency domain. For example, the overlap between the available frequency resource 810-B (RB set 910-B) and the DL direction may be approximately 15 MHz and the overlap between the available frequency resource 810-B (RB set 910-B) and the UL direction may be approximately 5 MHz. Since the available frequency resource 810-B (RB set 910-B) overlaps more with the DL direction in the frequency domain, the UE 115-*a* assigns the DL direction to the available frequency resource 810-B (RB set 910-B).

In the example in FIG. 11, a direction is not assigned to frequency resource 810-C(RB set 910-C), which is not available in this example.

If an available frequency resource overlaps equally with two directions, then the UE 115-*a* may assign either direction to the available frequency resource. For example, the RRC message 210 may include an indicator indicating to the UE 115-*a* how to handle the case where an available frequency resource overlaps equally with the UL direction and the DL direction. If the indicator indicates the UL direction, then UE 115-*a* may assign the UL direction to an available frequency resource that overlaps equally with the UL direction and DL direction. If the indicator indicates the DL direction, then UE 115-*a* may assign the DL direction to an available frequency resource that overlaps equally with the UL direction and DL direction. Thus, the manner in which the UE 115-*a* handles the case where an available frequency resource overlaps equally with the UL direction and the DL direction may be configured (e.g., by the RRC message 210).

Although the above approach is discussed above using the example of the UL direction and the DL direction, it is to be appreciated that the above approach may also apply to the in-band full duplex direction. For example, if an available frequency resource falls entirely within the in-band full duplex direction in a frequency format (e.g., frequency format 535-E) in the frequency domain, then the UE 115-*a* may assign the in-band full duplex direction to the available frequency resource. In another example, if an available frequency resource overlaps the in-band full duplex direction and UL direction in a frequency format (e.g., frequency format 535-G or 535-H) in the frequency domain and overlaps more with the in-band full duplex direction, then the UE 115-*a* may assign the in-band full duplex direction to the available frequency resource.

Figure 12:
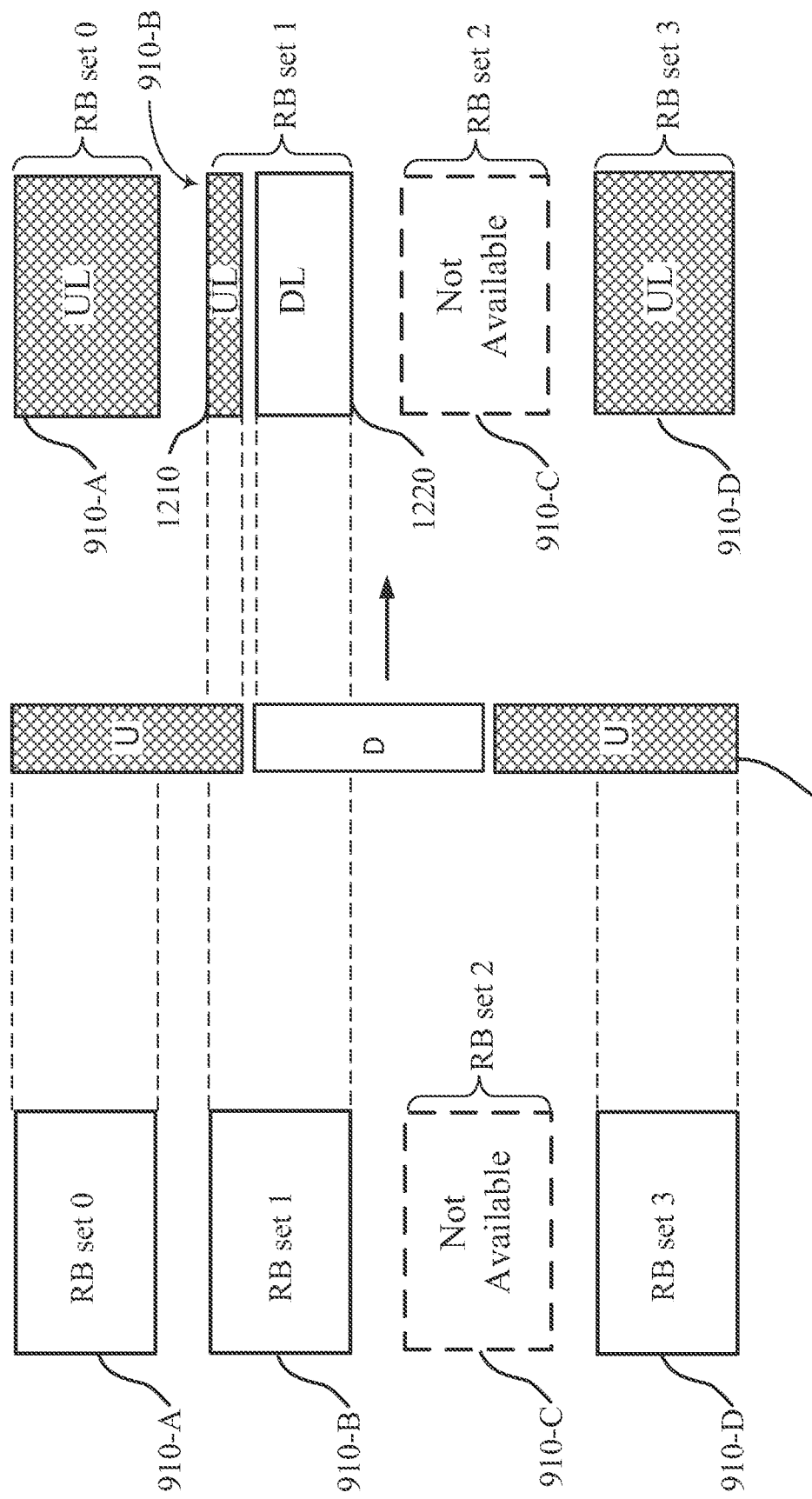
FIG. 12 illustrates another example of mapping communication directions in a frequency format to available frequency resources according to certain aspects of the present disclosure.

In some aspects, the UE 115-*a* may map the communication direction in the frequency format to the available frequency resources in the frequency domain such that the communication directions for the available frequency resources match the communication directions in the frequency format in the frequency domain. An example of this approach is described below according to aspects of the present disclosure with reference to an example illustrated in FIG. 12. In the example in FIG. 12, the frequency format 535-A is used. However, it is to be appreciated that another frequency format may be used (e.g., depending on the frequency format indicated in the second portion 520 of the resource format indicator 510-E or the reserved portion 615). As discussed above with reference to FIG. 5, a frequency format allocates (i.e., assigns) a communication direction (e.g., UL direction, DL direction, or in-band full duplex) to each one of one or more frequency resources. Note that, in FIG. 12, frequency is in the vertical direction.

In this approach, the UE 115-a matches the communication directions in the available frequency resources (RB sets) with the communication directions in the frequency format in the frequency domain. In the example in FIG. 12, the available frequency resources are frequency resources 810-A, 810-B, and 810-D (RB sets 910-A, 910-B, and 910-D). In this approach, if an available frequency resource falls entirely within one direction in the frequency format in the frequency domain, then the UE 115-a assigns that direction to the available frequency resource, as shown in the example in FIG. 12.

If an available frequency resource overlaps different directions in the frequency format in the frequency domain, then the UE 115-a may assign different directions to different portions of the available frequency resource such that the directions in the available frequency resource match the directions in the frequency format in the frequency domain. In the example in FIG. 12, the available frequency resource 810-B (RB set 910-B) overlaps with the UL direction and the DL direction in the frequency format 535-A in the frequency domain. In this example, the UE 115-a assigns a first portion 1210 of the frequency resource 810-B (RB set 910-B) the UL direction and assigns a second portion 1220 of the frequency resource 810-B (RB set 910-B) the DL direction such that the UL direction and the DL direction in the frequency resource 810-B match the UL direction and the DL direction in the frequency format 535-A in the frequency domain.

Figure 13:
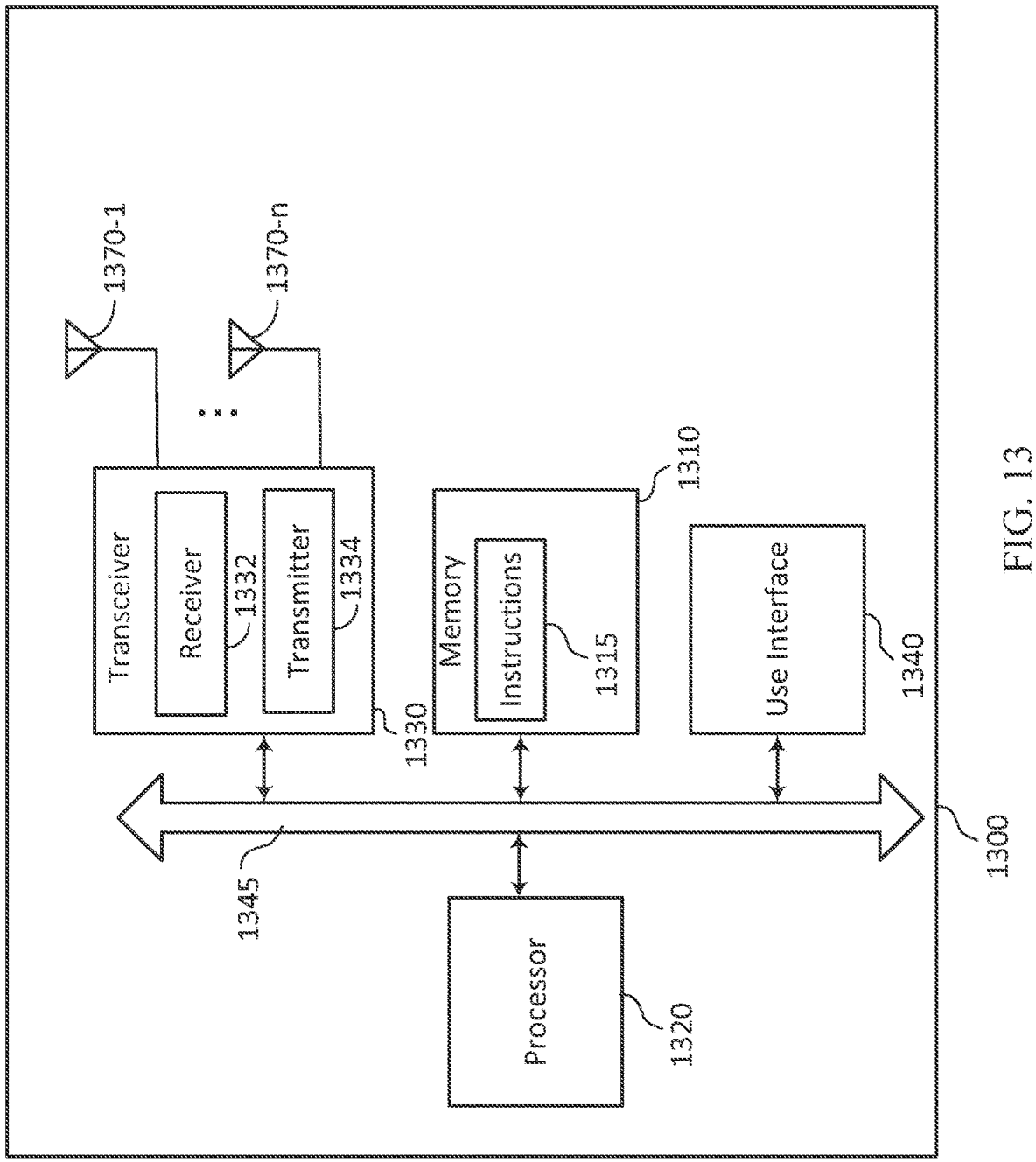
FIG. 13 shows an example device in which aspects of the present disclosure may be implemented.

FIG. 13 illustrates an example device 1300 according to certain aspects of the present disclosure. The device 1300 may be configured to operate in a base station (e.g., base station 105-a) or a UE (e.g., UE 115-a) and may be configured to perform one or more of the operations described herein. The device 1300 may include a processor 1320, a memory 1310, a transceiver 1330, one or more antennas 1370-1 to 1370-n, and a user interface 1340. These components may be in electronic communication via one or more buses 1345.

The memory 1310 may store instructions 1315 that are executable by the processor 1320 to cause the device 1300 to perform one or more of the operations described herein. The processor 1320 may include a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof. The memory 1310 may include, by way of example, random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives, or any other suitable storage medium, or any combination thereof.

The transceiver 1330 is coupled to the one or more antennas 1370-1 to 1370-n and may be configured to transmit and receive signals via the one or more antennas 1370-1 to 1370-n. The transceiver 1330 includes a receiver 1332 and a transmitter 1334. The receiver 1332 is configured to receive signals via the one or more antennas 1370-1 to 1370-1. In certain aspects, the receiver 1332 may receive RF signals including information (e.g., control message) and/or data. The receiver 1332 may then frequency down-convert the received RF signals into baseband signals and demodulate the baseband signals to recover the information and/or data. The receiver 1332 may send the recovered information and/or data to the processor 1320 via the one or more buses 1345 for further processing. For the example of a UE (e.g., UE 115-a), the information may include the control message 505 and the processor 1320 may determine the available frequency resources and communication directions for the available frequency resources based on the received information.

The transmitter 1334 is configured to transmit signals via the one or more antennas 1370-1 to 1370-n. In certain aspects, the transmitter 1334 is configured to receive information (e.g., control message) and/or data from the processor 1320 via the one or more buses 1345, module and frequency upconvert the information and/or data into RF signals, and transmit the RF signals via the one or more antennas 1370-1 to 370-n.

For the example of a UE (e.g., UE 115-a), the receiver 1332 receives signals via the one or more antennas 1370-1 to 1370-n in the DL direction and the transmitter 1334 transmits signals via the one or more antennas 1370-1 to 1370-n in the UL direction. For the example of a base station (e.g., base station 105-a), the receiver 1332 receives signals via the one or more antennas 1370-1 to 1370-n in the UL direction and the transmitter 1334 transmits signals via the one or more antennas 1370-1 to 1370-n in the DL direction.

In certain aspects, the transmitter 1334 and the receiver 1332 may transmit and receive signals simultaneous using the same frequency resource for in-band full duplex. To facilitate in-band full duplex, the receiver 1332 employ self-interference cancellation in which the receiver 1332 subtracts the known transmitted signal transmitted by the transmitter 1334 from a signal received at the receiver 1332 to cancel out self-interference. The transmitter 1334 and receiver 1332 may also reduce self-inference by transmitting and receiving signals in different directions and/or transmitting and receiving signals via difference ones of the antennas 1370-1 to 1370-n.

In the case of a UE (e.g., UE 115-a), the device 1300 may include a user interface 1340 coupled to the processor 1320. The user interface 1340 may be configured to receive data from a user (e.g., via keypad, mouse, etc.) and provide the data to the processor 1320. The user interface 1340 may also be configured to output data from the processor 1320 to the user (e.g., via a display, a speaker, etc.). In this case, the data may undergo additional processing before being output to the user. In the case of a base station (e.g., base station 105-a), the user interface 1340 may be omitted.

Figure 14:
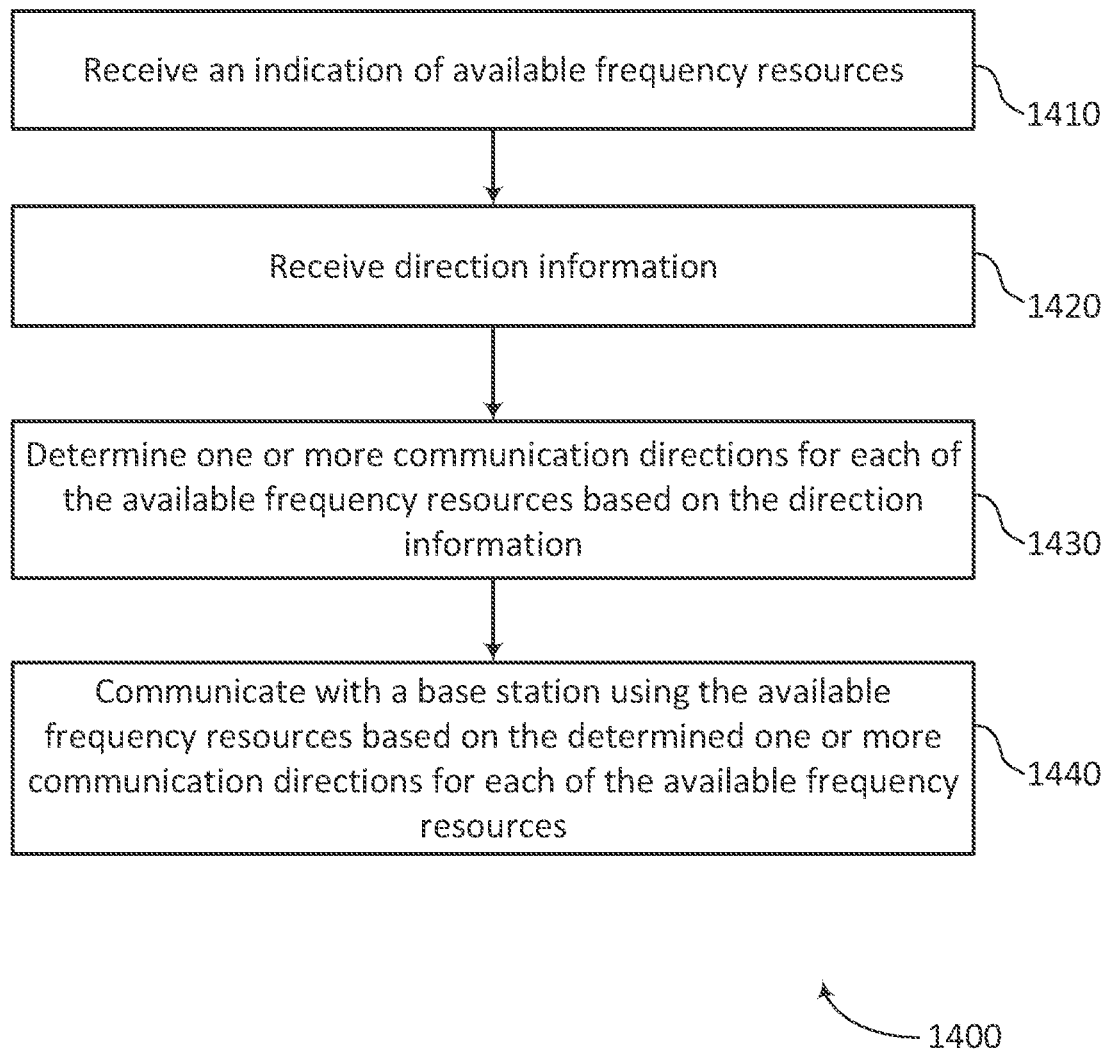
FIG. 14 is a flowchart illustrating a method of wireless communication at a UE according to certain aspects of the present disclosure.

FIG. 14 illustrates an example of a method 1400 of wireless communication at a UE (e.g., 115-a). For the example where the UE is implemented with the device 1300, the method 1400 may be performed by the device 1300.

At block 1410, an indication of available frequency resources is received. For example, the indication of the available frequency resource may be received by the receiver 1332 (e.g., via one or more of the antennas 1370-1 to 1370-*n*). Each of the available frequency resources may include a respective frequency band, a respective set of resource blocks, respective subcarriers, etc. For the example where each available frequency resource includes a respective set of resource blocks (e.g., RB sets 910-A to 910-D), each resource block in a set of resource blocks may include a set of subcarriers (e.g., 12 subcarriers). In some aspects, the available frequency resources may be separated by one or more guard bands. In some aspects, there may be no guard bands or very same guard bands between the frequency resources.

At block 1420, direction information is received. For example, the direction information may be received by the receiver 1332 (e.g., via one or more of the antennas 1370-1 to 1370-*n*). In one example, the direction information may include indicators, each of the indicators indicating a communication direction for a respective one of the available frequency resources. In this example, each of the indicators may indicate an uplink (UL) direction, a downlink (DL) direction, or an in-band full duplex direction for the respective one of the available frequency resources. In one example, the direction information may include an indicator of a frequency format (e.g., one of the frequency formats 535-A to 535-H). In this example, the indicator of the frequency format may be received in a resource format indicator (e.g., resource format indicator 510-E) or a reserved portion 615 of a control message (e.g., control message 505). In some aspects, the indication of the available frequency resources and the direction information may be received in a control message (e.g., control message 505).

At block 1430, one or more communication directions is determined for each of the available frequency resources based on the direction information. For example, the determination may be performed by the processor 1320. For the example where the direction information includes an indication of a frequency format, the processor 1320 may determine the one or more communication directions for each of the available frequency resources by mapping communication directions in the indicated frequency format to the available frequency resources in the frequency domain.

At block 1440, the UE communicates with a base station using the available frequency resources based on the determined one or more communication directions for each of the available frequency resources. For example, the communication may be performed by the receiver 1332 and/or the transmitter 1334. For example, if a determined communication direction for a frequency resource is the DL direction, then the UE (e.g., 115-*a*) may receive data from the base station (e.g., base station 105-*a*) on the frequency resource using the receiver 1332. If a determined communication direction for a frequency resource is the UL direction, then the UE (e.g., 115-*a*) may transmit data to the base station (e.g., base station 105-*a*) on the frequency resource using the transmitter 1334. If a determined communication direction for a frequency resource is the in-band full-duplex direction, then the UE (e.g., 115-*a*) may receive data from and transmit data to the base station (e.g., base station 105-*a*) on the frequency resource using the receiver 1332 and the transmitter 1334.

In certain aspects, the method 1400 may optionally include receiving a channel occupancy time (COT) duration, wherein communicating with the base station using the available frequency resources comprises communicating with the base station using the available frequency resources within the COT duration. In certain aspects, the COT duration may be received in a control message (e.g., control message 505).

In certain aspects, determining the one or more communication directions for each of the available frequency resources based on the direction information may include mapping the communication directions in an indicated frequency format to the available frequency resources in the frequency domain. In certain aspects, mapping the communication directions in an indicated frequency format to the available frequency resources in the frequency domain may include, if one of the available frequency resources falls entirely within one of the communication directions in the frequency format in the frequency domain, then assigning the one of the communication directions to the one of the available frequency resources. In certain aspects, mapping the communication directions in an indicated frequency format to the available frequency resources in the frequency domain may include, if one of the available frequency resources overlaps a first of the communication directions and a second one of the communication directions in the frequency format in the frequency domain, then determining which one of the first one of the communication directions and the second one of the communication directions overlaps most with the one of the available frequency resources in the frequency domain, and assigning the determined one of the first one of the communication directions and the second one of the communication directions to the one of the available frequency resources. In certain aspects, mapping the communication directions in an indicated frequency format to the available frequency resources in the frequency domain may include, if one of the available frequency resources overlaps with a first one of the communication directions and a second one of the communication directions in the frequency format in the frequency domain, then assigning the first one of the communication directions to a first portion (e.g., first portion 1210) of the one of the available frequency resource and assigning the second one of the communication directions to a second portion (e.g., second portion 1220) of the one of the available frequency resources.

Figure 15:
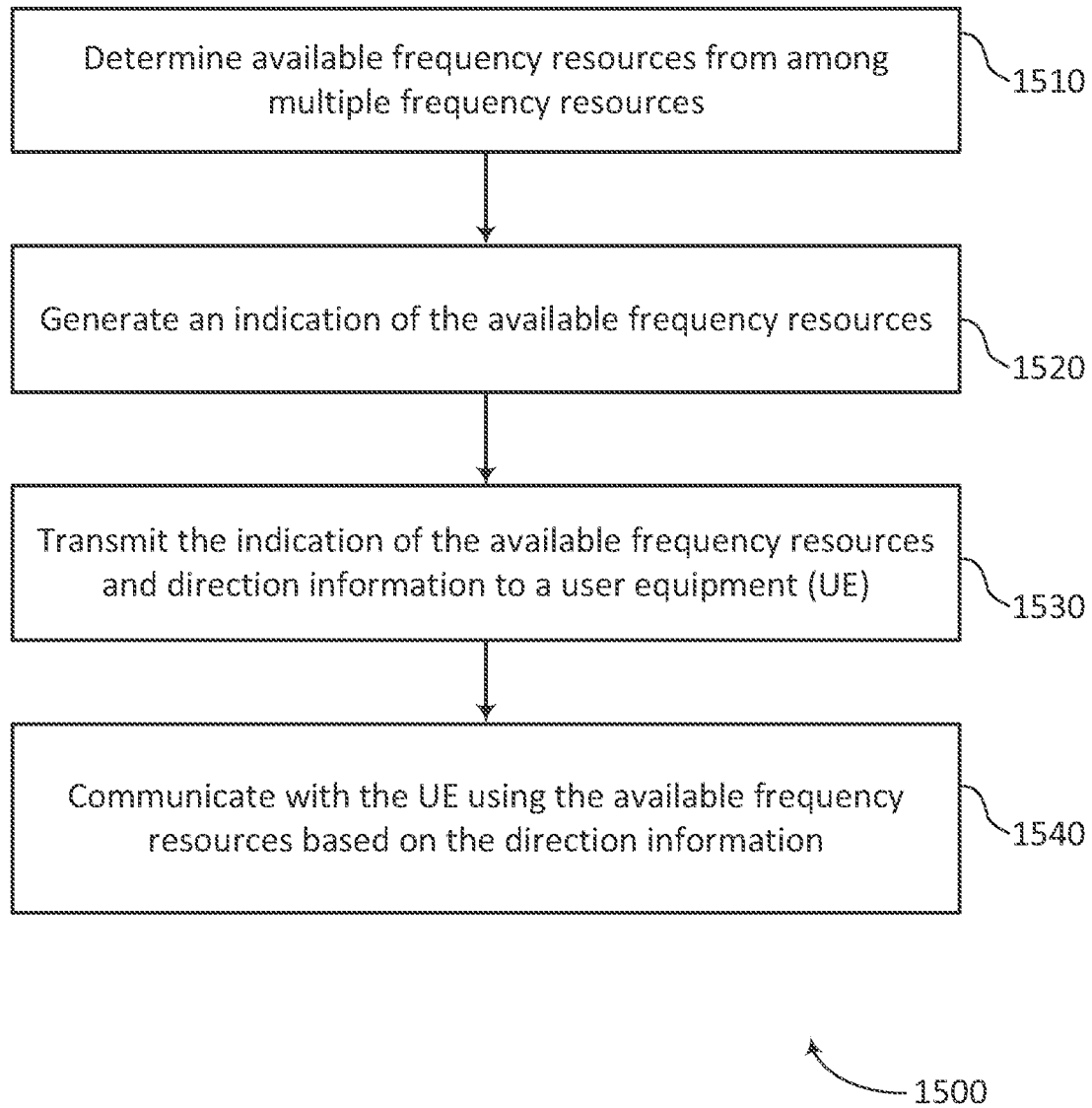
FIG. 15 is a flowchart illustrating a method of wireless communication at a base station according to certain aspects of the present disclosure.

FIG. 15 illustrates an example of a method 1500 of wireless communication at a base station (e.g., 105-*a*). For the example where the base station is implemented with the device 1300, the method 1500 may be performed by the device 1300.

At block 1510, available frequency resources are determined from among multiple frequency resources. For example, the available frequency resources may be determined by the receiver 1332 and the processor 1320. For example, the available frequency resource may be determined by detecting energy for each of the multiple frequency resources (e.g., frequency resources 810-A to 810-D, RB sets 910-A to 910-D, etc.), comparing the detected energy for each of the multiple frequency resources with a threshold (e.g., energy detection (ED) threshold), and determining the available frequency resources based on the comparisons. The energy detection may be performed by the receiver 1332, and the comparison and determination may be performed by the processor 1320. In certain aspects, the processor may determine that a frequency resource is available if the respective detected energy is below the threshold, and determine that the frequency resource is not available if the respective detected energy is above the threshold.

At block 1520, an indication of the available frequency resources is generated. For example, the processor 1320 may generate the indication of the available frequency resources.

At block 1530, the indication of the available frequency resources and direction information are transmitted to a user equipment (UE). For example, the transmitter 1334 may transmit the indication of the available frequency resources and direction information. In certain aspects, the indication of the available frequency resources and direction information are transmitted in a control message (e.g., control message 505).

At block 1540, the base station communicates with the UE using the available frequency resources based on the direction information. For example, if the direction information indicates the DL direction for a frequency resource, then the base station (e.g., base station 105-*a*) may transmit data to the UE (e.g., UE 115-*a*) on the frequency resource using the transmitter 1334. If the direction information indicates the UL direction for a frequency resource, then the base station (e.g., 105-*a*) may receive data from the UE (e.g., UE 115-*a*) on the frequency resource using the receiver 1332. If the direction information indicates in-band full duplex for a frequency resource, then the base station (e.g., 105-*a*) may receive data from and transmit data to the UE (e.g., UE 115-*a*) on the frequency resource using the receiver 1332 and the transmitter 1334.

In certain aspects, each of the available frequency resources comprises a respective frequency band. In certain aspects, each of the available frequency resources comprises a respective set of resource blocks. Each resource block in a set of resource blocks may include a set of subcarriers.

In certain aspects, the method 1500 may further include transmitting a COT duration to the UE, wherein communicating with the UE using the available frequency resources comprises communicating with the UE using the available frequency resources within the COT duration. For example, the transmitter 1334 may transmit the COT duration.

In certain aspects, the direction information comprises indicators, each of the indicators indicating a communication direction for a respective one of the available frequency resources.

In certain aspects, each of the available frequency resources comprises two or more portions, and the direction information comprises indicators, each of the indicators indicating a communication direction for a respective one of the two or more portions of a respective one of the available frequency resources.

In certain aspects, the direction information comprises an indicator indicating a frequency format (e.g., one of the frequency formats 535-A to 535-H). In certain aspects, the indicator indicating the frequency format is in a resource format indicator (e.g., resource format indicator 510-E) in the control message (e.g., control message 505). In certain aspects, the resource format indicator comprises a slot format indicator.

The method 1500 may optionally include generating a position indicator indicating a position of the resource format indicator in the control message, and transmitting the position indicator to the UE. For example, the processor 1320 may generate the position indicator and the transmitter 1334 may transmit the position indicator (e.g., in an RRC message 210, a control message 505 (e.g., DCI), etc.).

Implementation examples are described in the following numbered clauses:

1. A method of wireless communication at a user equipment (UE), comprising:
    receiving an indication of available frequency resources;
    receiving direction information;
    determining one or more communication directions for each of the available frequency resources based on the direction information; and
    communicating with a base station using the available frequency resources based on the determined one or more communication directions for each of the available frequency resources.
2. The method of clause 1, wherein the indication of available frequency resources and the direction information are received in a control message.
3. The method of clause 2, wherein the control message includes a downlink control information.
4. The method of any one of clauses 1 to 3, wherein each of the available frequency resources comprises a respective frequency band.
5. The method of any one of clauses 1 to 4, wherein each of the available frequency resources comprises a respective set of resource blocks.
6. The method of clause 5, wherein, for each of the available frequency resources, each resource block in the respective set of resource blocks includes a respective set of subcarriers.
7. The method of any one of clauses 1 to 6, wherein each of the available frequency resources comprises respective subcarriers.
8. The method of any one of clauses 1 to 7, further comprising receiving a channel occupancy time (COT) duration, wherein communicating with the base station using the available frequency resources comprises communicating with the base station using the available frequency resources within the COT duration.
9. The method of any one of clauses 1 to 8, wherein the direction information comprises indicators, each of the indicators indicating a communication direction for a respective one of the available frequency resources.
10. The method of clause 9, wherein each of the indicators indicates an uplink (UL) direction, a downlink (DL) direction, or an in-band full duplex direction for the respective one of the available frequency resources.
11. The method of any one of clauses 1 to 8, wherein:
    each of the available frequency resources comprises two or more portions; and
    the direction information comprises indicators, each of the indicators indicating a communication direction for a respective one of the two or more portions of a respective one of the available frequency resources.
12. The method of any one of clauses 1 to 8, wherein:
    the direction information comprises an indicator indicating a frequency format; and
    determining the one or more communication directions for each of the available frequency resources comprises mapping communication directions in the indicated frequency format to the available frequency resources in a frequency domain.
13. The method of clause 12, wherein mapping the communication directions in the indicated frequency format to the available frequency resources in the frequency domain comprises:
    if one of the available frequency resources falls entirely within one of the communication directions in the frequency format in the frequency domain, assigning the one of the communication directions to the one of the available frequency resources.

14. The method of clause 13, wherein the one of the communication directions comprises one of an uplink (UL) direction, a downlink (DL) direction, or an in-band full duplex direction.
15. The method of any one of clauses 12 to 14, wherein mapping the communication directions in the indicated frequency format to the available frequency resources in the frequency domain comprises:
if one of the available frequency resources overlaps a first one of the communication directions and a second one of the communication directions in the frequency format in the frequency domain, determining which one of the first of the communication directions and the second one of the communication directions overlaps most with the one of the available frequency resources in the frequency domain, and assigning the determined one of the first one of the communication directions and the second one of the communication directions to the one of the available frequency resources.
16. The method of clause 15, wherein:
the first one of the communication directions comprises one of an uplink (UL) direction, a downlink (DL) direction, or an in-band full duplex direction; and
the second one of the communication directions comprises a different one of the UL direction, the DL direction, or the in-band full duplex direction.
17. The method of any one of clauses 12 to 14, wherein mapping the communication directions in the indicated frequency format to the available frequency resources in the frequency domain comprises:
if one of the available frequency resources overlaps with a first one of the communication directions and a second one of the communication directions in the frequency format in the frequency domain, assigning the first one of the communication directions to a first portion of the one of the available frequency resources and assigning the second one of the communication directions to a second portion of the one of the available frequency resources.
18. The method of clause 17, wherein:
the first one of the communication directions comprises one of an uplink (UL) direction, a downlink (DL) direction, or an in-band full duplex direction; and
the second one of the communication directions comprises a different one of the UL direction, the DL direction, or the in-band full duplex direction.
19. The method of any one of clauses 12 to 18, wherein the direction information is received in a control message.
20. The method of clause 19, wherein the direction information is in a resource format indicator in the control message.
21. The method of clause 20, wherein the resource format indicator comprises a slot format indicator.
22. The method of clause 20 or 21, further comprising:
determining a position of the resource format indicator in the control message; and
receiving the direction information in the resource format indicator based on the determined position.
23. An apparatus for wireless communication, comprising:
a processor;
a memory coupled with the processor; and
instructions stored in the memory and executable by the processor to cause the apparatus to:
receive an indication of available frequency resources;
receive direction information;
determine one or more communication directions for each of the available frequency resources based on the direction information; and
communicate with a base station using the available frequency resources based on the determined one or more communication directions for each of the available frequency resources.
24. The apparatus of clause 23, wherein the indication of available frequency resources and the direction information are received in a control message.
25. The apparatus of clause 24, wherein the control message includes a downlink control information.
26. The apparatus of any one of clauses 23 to 25, wherein each of the available frequency resources comprises a respective frequency band.
27. The apparatus of any one of clauses 23 to 26, wherein each of the available frequency resources comprises a respective set of resource blocks.
28. The apparatus of clause 27, wherein, for each of the available frequency resources, each resource block in the respective set of resource blocks includes a respective set of subcarriers.
29. The apparatus of any one of clauses 23 to 28, wherein each of the available frequency resources comprises respective subcarriers.
30. The apparatus of any one of clauses 23 to 29, further comprising instructions executable by the processor to cause the apparatus to receive a channel occupancy time (COT) duration, wherein the instructions executable by the processor to cause the apparatus to communicate with the base station using the available frequency resources comprises instructions executable by the processor to cause the apparatus to communicate with the base station using the available frequency resources within the COT duration.
31. The apparatus of any one of clauses 23 to 30, wherein the direction information comprises indicators, each of the indicators indicating a communication direction for a respective one of the available frequency resources.
32. The apparatus of clause 31, wherein each of the indicators indicates an uplink (UL) direction, a downlink (DL) direction, or an in-band full duplex direction for the respective one of the available frequency resources.
33. The apparatus of any one of clauses 23 to 30, wherein each of the available frequency resources comprises two or more portions, and the direction information comprises indicators, each of the indicators indicating a communication direction for a respective one of the two or more portions of a respective one of the available frequency resources.
34. The apparatus of any one of clauses 23 to 30, wherein the direction information comprises an indicator indicating a frequency format, and the instructions executable by the processor to cause the apparatus to determine the one or more communication directions for each of the available frequency resources comprise instructions executable by the processor to cause the apparatus to map communication directions in the indicated frequency format to the available frequency resources in a frequency domain
35. The apparatus of clause 34, wherein the instructions executable by the processor to cause the apparatus to map the communication directions in the indicated frequency format to the available frequency resources in the frequency domain comprise instructions executable by the processor to cause the apparatus to:

if one of the available frequency resources falls entirely within one of the communication directions in the frequency format in the frequency domain, assign the one of the communication directions to the one of the available frequency resources.

36. The apparatus of clause 35, wherein the one of the communication directions comprises one of an uplink (UL) direction, a downlink (DL) direction, or an in-band full duplex direction.

37. The apparatus of any one of clauses 34 to 36, wherein the instructions executable by the processor to cause the apparatus to map the communication directions in the indicated frequency format to the available frequency resources in the frequency domain comprise instructions executable by the processor to cause the apparatus to:
if one of the available frequency resources overlaps a first one of the communication directions and a second one of the communication directions in the frequency format in the frequency domain, determine which one of the first one of the communication directions and the second one of the communication directions overlaps most with the one of the available frequency resources in the frequency domain, and assign the determined one of the first one of the communication directions and the second one of the communication directions to the one of the available frequency resources.

38. The apparatus of clause 37, wherein:
the first one of the communication directions comprises one of an uplink (UL) direction, a downlink (DL) direction, or an in-band full duplex direction; and
the second one of the communication directions comprises a different one of the UL direction, the DL direction, or the in-band full duplex direction.

39. The apparatus of any one of clauses 34 to 36, wherein the instructions executable by the processor to cause the apparatus to map the communication directions in the indicated frequency format to the available frequency resources in the frequency domain comprise instructions executable by the processor to cause the apparatus to:
if one of the available frequency resources overlaps with a first one of the communication directions and a second one of the communication directions in the frequency format in the frequency domain, assign the first one of the communication directions to a first portion of the one of the available frequency resources and assign the second one of the communication directions to a second portion of the one of the available frequency resources.

40. The apparatus of clause 39, wherein:
the first one of the communication directions comprises one of an uplink (UL) direction, a downlink (DL) direction, or an in-band full duplex direction; and
the second one of the communication directions comprises a different one of the UL direction, the DL direction, or the in-band full duplex direction.

41. The apparatus of any one of clauses 34 to 40, wherein the instructions executable by the processor to cause the apparatus to receive the direction information comprise instructions executable by the processor to cause the apparatus to receive the direction information in a control message.

42. The apparatus of clause 41, wherein the direction information is in a resource format indicator in the control message.

43. The apparatus of clause 42, wherein the resource format indicator comprises a slot format indicator.

44. The apparatus of clause 42 or 43, further comprising instructions executable by the processor to cause the apparatus to:
determine a position of the resource format indicator in the control message; and
receive the direction information in the resource format indicator based on the determined position.

45. An apparatus for wireless communication at a user equipment (UE), comprising:
means for receiving an indication of available frequency resources;
means for receiving direction information;
means for determining one or more communication directions for each of the available frequency resources based on the direction information; and
means for communicating with a base station using the available frequency resources based on the determined one or more communication directions for each of the available frequency resources.

46. The apparatus of clause 45, wherein the indication of available frequency resources and the direction information are received in a control message.

47. The apparatus of clause 46, wherein the control message includes a downlink control information.

48. The apparatus of any one of clauses 45 to 47, wherein each of the available frequency resources comprises a respective frequency band.

49. The apparatus of any one of clauses 45 to 48, wherein each of the available frequency resources comprises a respective set of resource blocks.

50. The apparatus of clause 49, wherein, for each of the available frequency resources, each resource block in the respective set of resource blocks includes a respective set of subcarriers.

51. The apparatus of any one of clauses 45 to 50, wherein each of the available frequency resources comprises respective subcarriers.

52. The apparatus of any one of clauses 45 to 51, further comprising means for receiving a channel occupancy time (COT) duration, wherein the means for communicating with the base station using the available frequency resources comprises means for communicating with the base station using the available frequency resources within the COT duration.

53. The apparatus of any one of clauses 45 to 52, wherein the direction information comprises indicators, each of the indicators indicating a communication direction for a respective one of the available frequency resources.

54. The apparatus of clause 53, wherein each of the indicators indicates an uplink (UL) direction, a downlink (DL) direction, or an in-band full duplex direction for the respective one of the available frequency resources.

55. The apparatus of any one of clauses 45 to 52, wherein:
each of the available frequency resources comprises two or more portions; and
the direction information comprises indicators, each of the indicators indicating a communication direction for a respective one of the two or more portions of a respective one of the available frequency resources.

56. The apparatus of any one of clauses 45 to 52, wherein:
the direction information comprises an indicator indicating a frequency format; and
the means for determining the one or more communication directions for each of the available frequency resources comprises means for mapping communication directions in the indicated frequency format to the available frequency resources in a frequency domain 57. The apparatus of clause 56, wherein the means for mapping the communication directions in the indicated frequency format to the available frequency resources in the frequency domain comprises:

means for, if one of the available frequency resources falls entirely within one of the communication directions in the frequency format in the frequency domain, assigning the one of the communication directions to the one of the available frequency resources.

58. The apparatus of clause 57, wherein the one of the communication directions comprises one of an uplink (UL) direction, a downlink (DL) direction, or an in-band full duplex direction.

59. The apparatus of any one of clauses 56 to 58, wherein the means for mapping the communication directions in the indicated frequency format to the available frequency resources in the frequency domain comprises:

means for, if one of the available frequency resources overlaps a first one of the communication directions and a second one of the communication directions in the frequency format in the frequency domain, determining which one of the first one of the communication directions and the second one of the communication directions overlaps most with the one of the available frequency resources in the frequency domain, and assigning the determined one of the first one of the communication directions and the second one of the communication directions to the one of the available frequency resources.

60. The apparatus of clause 59, wherein:

the first one of the communication directions comprises one of an uplink (UL) direction, a downlink (DL) direction, or an in-band full duplex direction; and the second one of the communication directions comprises a different one of the UL direction, the DL direction, or the in-band full duplex direction.

61. The apparatus of any one of clauses 56 to 58, wherein the means for mapping the communication directions in the indicated frequency format to the available frequency resources in the frequency domain comprises:

means for, if one of the available frequency resources overlaps with a first one of the communication directions and a second one of the communication directions in the frequency format in the frequency domain, assigning the first one of the communication directions to a first portion of the one of the available frequency resources and assigning the second one of the communication directions to a second portion of the one of the available frequency resources.

62. The apparatus of clause 61, wherein:

the first one of the communication directions comprises one of an uplink (UL) direction, a downlink (DL) direction, or an in-band full duplex direction; and the second one of the communication directions comprises a different one of the UL direction, the DL direction, or the in-band full duplex direction.

63. The apparatus of any one of clauses 56 to 62, wherein the direction information is received in a control message.

64. The apparatus of clause 63, wherein the direction information is in a resource format indicator in the control message.

65. The apparatus of clause 64, wherein the resource format indicator comprises a slot format indicator.

66. The apparatus of clause 64 or 65, further comprising:

means for determining a position of the resource format indicator in the control message; and means for receiving the direction information in the resource format indicator based on the determined position.

67. A method of wireless communication at a base station, comprising:

determining available frequency resources from among multiple frequency resources;

generating an indication of the available frequency resources;

transmitting the indication of the available frequency resources and direction information to a user equipment (UE); and communicating with the UE using the available frequency resources based on the direction information.

68. The method of clause 67, wherein determining the available frequency resources comprises:

detecting energy for each of the multiple frequency resources;

comparing the detected energy for each of the multiple frequency resources with a threshold; and determining the available frequency resources based on the comparisons.

69. The method of clause 67 or 68, wherein transmitting the indication of the available frequency resources and the direction information comprises:

generating a control message including the indication of the available frequency resources and the direction information; and transmitting the control message.

70. The method of clause 69, wherein the control message includes a downlink control information.

71. The method of any one of clauses 67 to 70, wherein each of the available frequency resources comprises a respective frequency band.

72. The method of any one of clauses 67 to 71, wherein each of the available frequency resources comprises a respective set of resource blocks.

73. The method of clause 72, wherein, for each of the available frequency resources, each resource block in the respective set of resource blocks includes a respective set of subcarriers.

74. The method of any one of clauses 67 to 73, wherein each of the available frequency resources comprises respective subcarriers.

75. The method of any one of clauses 67 to 74, further comprising:

transmitting a channel occupancy time (COT) duration to the UE, wherein communicating with the UE using the available frequency resources comprises communicating with the UE using the available frequency resources within the COT duration.

76. The method of any one of clauses 67 to 75, wherein the direction information comprises indicators, each of the indicators indicating a communication direction for a respective one of the available frequency resources.

77. The method of clause 76, wherein each of the indicators indicates an uplink (UL) direction, a downlink (DL) direction, or an in-band full duplex direction for the respective one of the available frequency resources.

78. The method of any one of clauses 67 to 75, wherein:

each of the available frequency resources comprises two or more portions; and the direction information comprises indicators, each of the indicators indicating a communication direction for a respective one of the two or more portions of a respective one of the available frequency resources.

79. The method of any one of clauses 67 to 75, wherein the direction information comprises an indicator indicating a frequency format.

80. The method of clause 79, wherein transmitting the direction information comprises:
generating a control message including the indicator indicating the frequency format; and
transmitting the control message to the UE.

81. The method of clause 80, wherein the indicator indicating the frequency format is in a resource format indicator in the control message.

82. The method of clause 81, wherein the resource format indicator comprises a slot format indicator.

83. The method of clause 81 or 82, further comprising:
generating a position indicator indicating a position of the resource format indicator in the control message; and
transmitting the position indicator to the UE.

84. An apparatus for wireless communication, comprising:
a processor;
a memory coupled with the processor; and
instructions stored in the memory and executable by the processor to cause the apparatus to:
determine available frequency resources from among multiple frequency resources;
generate an indication of the available frequency resources;
transmit the indication of the available frequency resources and direction information to a user equipment (UE); and
communicate with the UE using the available frequency resources based on the direction information.

85. The apparatus of clause 84, wherein the instructions executable by the processor to cause the apparatus to determine the available resources comprise instructions executable by the processor to cause the apparatus to:
detect energy for each of the multiple frequency resources;
compare the detected energy for each of the multiple frequency resources with a threshold; and
determine the available frequency resources based on the comparisons.

86. The apparatus of clause 84 or 85, wherein the instructions executable by the processor to cause the apparatus to transmit the indication of the available frequency resources and the direction information comprise instructions executable by the processor to cause the apparatus to:
generate a control message including the indication of the available frequency resources and the direction information; and
transmit the control message.

87. The apparatus of clause 86, wherein the control message includes a downlink control information.

88. The apparatus of any one of clauses 84 to 87, wherein each of the available frequency resources comprises a respective frequency band.

89. The apparatus of any one of clauses 84 to 88, wherein each of the available frequency resources comprises a respective set of resource blocks.

90. The apparatus of clause 89, wherein, for each of the available frequency resources, each resource block in the respective set of resource blocks includes a respective set of subcarriers.

91. The apparatus of any one of clauses 84 to 90, wherein each of the available frequency resources comprises respective subcarriers.

92. The apparatus of any one of clauses 84 to 91, further comprising instructions executable by the processor to cause the apparatus to transmits a channel occupancy time (COT) duration to the UE, wherein the instructions executable by the processor to cause the apparatus to communicate with the UE using the available frequency resources comprise instructions executable by the processor to cause the apparatus to communicate with the UE using the available frequency resources within the COT duration.

93. The apparatus of any one of clauses 84 to 92, wherein the direction information comprises indicators, each of the indicators indicating a communication direction for a respective one of the available frequency resources.

94. The apparatus of clause 93, wherein each of the indicators indicates an uplink (UL) direction, a downlink (DL) direction, or an in-band full duplex direction for the respective one of the available frequency resources.

95. The apparatus of any one of clauses 84 to 92, wherein:
each of the available frequency resources comprises two or more portions; and
the direction information comprises indicators, each of the indicators indicating a communication direction for a respective one of the two or more portions of a respective one of the available frequency resources.

96. The apparatus of any one of clauses 84 to 92, wherein the direction information comprises an indicator indicating a frequency format.

97. The apparatus of clause 96, wherein the instructions executable by the processor to cause the apparatus to transmit the direction information comprise instructions executable by the processor to cause the apparatus to:
generate a control message including the indicator indicating the frequency format; and
transmit the control message to the UE.

98. The apparatus of clause 97, wherein the indicator indicating the frequency format is in a resource format indicator in the control message.

99. The apparatus of clause 98, wherein the resource format indicator comprises a slot format indicator.

100. The apparatus of clause 98 or 99, wherein the instructions cause the apparatus to:
generate a position indicator indicating a position of the resource format indicator in the control message; and
transmit the position indicator to the UE.

101. An apparatus for wireless communication at a base station, comprising:
means for determining available frequency resources from among multiple frequency resources;
means for generating an indication of the available frequency resources;
means for transmitting the indication of the available frequency resources and direction information to a user equipment (UE); and
means for communicating with the UE using the available frequency resources based on the direction information.

102. The apparatus of clause 101, wherein means for determining the available frequency resources comprises:
means for detecting energy for each of the multiple frequency resources;

means for comparing the detected energy for each of the multiple frequency resources with a threshold; and
means for determining the available frequency resources based on the comparisons.

103. The apparatus of clause 101 or 102, wherein the means for transmitting the indication of the available frequency resources and the direction information comprises:
means for generating a control message including the indication of the available frequency resources and the direction information; and
means for transmitting the control message.

104. The apparatus of clause 103, wherein the control message includes a downlink control information.

105. The apparatus of any one of clauses 101 to 104, wherein each of the available frequency resources comprises a respective frequency band.

106. The apparatus of any one of clauses 101 to 104, wherein each of the available frequency resources comprises a respective set of resource blocks.

107. The apparatus of clause 106, wherein, for each of the available frequency resources, each resource block in the respective set of resource blocks includes a set of subcarriers.

108. The apparatus of any one of clauses 101 to 107, wherein each of the available frequency resources comprises respective subcarriers.

109. The apparatus of any one of clauses 101 to 108, further comprising means for transmitting a channel occupancy time (COT) duration to the UE, wherein the means for communicating with the UE using the available frequency resources comprises means for communicating with the UE using the available frequency resources within the COT duration.

110. The apparatus of any one of clauses 101 to 109, wherein the direction information comprises indicators, each of the indicators indicating a communication direction for a respective one of the available frequency resources.

111. The apparatus of clause 110, wherein each of the indicators indicates an uplink (UL) direction, a downlink (DL) direction, or an in-band full duplex direction for the respective one of the available frequency resources.

112. The apparatus of any one of clauses 101 to 109, wherein:
each of the available frequency resources comprises two or more portions; and
the direction information comprises indicators, each of the indicators indicating a communication direction for a respective one of the two or more portions of a respective one of the available frequency resources.

113. The apparatus of any one of clauses 101 to 109, wherein the direction information comprises an indicator indicating a frequency format.

114. The apparatus of clause 113, wherein the means for transmitting the direction information comprises:
means for generating a control message including the indicator indicating the frequency format; and
means for transmitting the control message to the UE.

115. The apparatus of clause 114, wherein the indicator indicating the frequency format is in a resource format indicator in the control message.

116. The apparatus of clause 115, wherein the resource format indicator comprises a slot format indicator.

117. The apparatus of clause 115 or 116, further comprising:

means for generating a position indicator indicating a position of the resource format indicator in the control message; and
means for transmitting the position indicator to the UE.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures. As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method of wireless communication at a user equipment (UE), comprising:
receiving an indication of available frequency resources;
receiving direction information indicating an in-band full duplex direction for at least one of the available frequency resources;
selecting one or more communication directions for each of the available frequency resources based on the direction information, wherein selecting the one or more communication directions for each of the available resources comprises identifying the in-band full duplex direction for the at least one of the available frequency resources based on the direction information; and
communicating with a base station using the available frequency resources based on the one or more communication directions for each of the available frequency resources.

2. The method of claim 1, further comprising receiving a channel occupancy time (COT) duration, wherein communicating with the base station using the available frequency resources comprises communicating with the base station using the available frequency resources within the COT duration.

3. The method of claim 1, wherein the direction information comprises indicators, each of the indicators indicating a communication direction for a respective one of the available frequency resources.

4. The method of claim 3, wherein each of the indicators indicates an uplink (UL) direction, a downlink (DL) direction, or the in-band full duplex direction for the respective one of the available frequency resources.

5. The method of claim 1, wherein:
each of the available frequency resources comprises two or more portions; and
the direction information comprises indicators, each of the indicators indicating a communication direction for a respective one of the two or more portions of a respective one of the available frequency resources.

6. A method of wireless communication at a user equipment (UE), comprising:
receiving an indication of available frequency resources;
receiving direction information including an indicator indicating a frequency format;
selecting one or more communication directions for each of the available frequency resources based on the direction information, wherein selecting the one or more communication directions for each of the available frequency resources comprises mapping communication directions in the indicated frequency format to the available frequency resources in a frequency domain, wherein one of the available frequency resources overlaps a first one of the communication directions and a second one of the communication directions in the frequency format in the frequency domain, and mapping the communication directions in the indicated frequency format to the available frequency resources in the frequency domain comprises determining which one of the first one of the communication directions and the second one of the communication directions overlaps most with the one of the available frequency resources in the frequency domain, and assigning the determined one of the first one of the communication directions and the second one of the communication directions to the one of the available frequency resources; and
communicating with a base station using the available frequency resources based on the one or more communication directions for each of the available frequency resources.

7. An apparatus for wireless communication, comprising:
at least one processor;
at least one memory coupled with the at least one processor; and
instructions stored in the at least one memory and executable by the at least one processor to cause the apparatus to:
receive an indication of available frequency resources;
receive direction information indicating an in-band full duplex direction for at least one of the available frequency resources;
select one or more communication directions for each of the available frequency resources based on the direction information, wherein the instructions executable by the at least one processor to cause the apparatus to select the one or more communication directions for each of the available frequency resources includes instructions executable by the at least one processor to cause the apparatus to identify the in-band full duplex direction for the at least one of the available frequency resources based on the direction information; and
communicate with a base station using the available frequency resources based on the one or more communication directions for each of the available frequency resources.

8. The apparatus of claim 7, further comprising instructions executable by the at least one processor to cause the apparatus to receive a channel occupancy time (COT) duration, wherein the instructions executable by the at least one processor to cause the apparatus to communicate with the base station using the available frequency resources comprises instructions executable by the at least one processor to cause the apparatus to communicate with the base station using the available frequency resources within the COT duration.

9. The apparatus of claim 7, wherein the direction information comprises indicators, each of the indicators indicating a communication direction for a respective one of the available frequency resources.

10. The apparatus of claim 9, wherein each of the indicators indicates an uplink (UL) direction, a downlink (DL) direction, or the in-band full duplex direction for the respective one of the available frequency resources.

11. The apparatus of claim 7, wherein each of the available frequency resources comprises two or more portions, and the direction information comprises indicators, each of the indicators indicating a communication direction for a respective one of the two or more portions of a respective one of the available frequency resources.

12. An apparatus for wireless communication, comprising:
at least one processor;
at least one memory coupled with the at least one processor; and
instructions stored in the at least one memory and executable by the at least one processor to cause the apparatus to:
receive an indication of available frequency resources;
receive direction information including an indicator indicating a frequency format;
select one or more communication directions for each of the available frequency resources based on the direction information, wherein the instructions executable by the at least one processor to cause the apparatus to select the one or more communication directions comprises instructions executable by the at least one processor to cause the apparatus to map communication directions in the indicated frequency format to the available frequency resources in a frequency domain, wherein one of the available frequency resources overlaps a first one of the communication directions and a second one of the communication directions in the frequency format in the frequency domain, and the instructions executable by the at least one processor to cause the apparatus to map the communication directions in the indicated frequency format to the available frequency resources in the frequency domain comprises instructions executable by the at least one processor to cause the apparatus to determine which one of the first one of the communication directions and the second one of the communication directions overlaps most with the one of the available frequency resources in the frequency domain, and assign the determined one of the first one of the communication directions and the second one of the communication directions to the one of the available frequency resources; and communicate with a base station using the available frequency resources based on the one or more communication directions for each of the available frequency resources.

13. A method of wireless communication at a base station, comprising:
generating an indication of available frequency resources;
transmitting the indication of the available frequency resources and direction information to a user equipment (UE), wherein the direction information indicates an in-band full duplex direction for at least one of the available frequency resources; and
communicating with the UE using the available frequency resources based on the direction information.

14. The method of claim 13, further comprising transmitting a channel occupancy time (COT) duration to the UE, wherein communicating with the UE using the available frequency resources comprises communicating with the UE using the available frequency resources within the COT duration.

15. The method of claim 13, wherein the direction information comprises indicators, each of the indicators indicating a communication direction for a respective one of the available frequency resources.

16. The method of claim 15, wherein each of the indicators indicates an uplink (UL) direction, a downlink (DL) direction, or the in-band full duplex direction for the respective one of the available frequency resources.

17. The method of claim 13, wherein:
each of the available frequency resources comprises two or more portions; and
the direction information comprises indicators, each of the indicators indicating a communication direction for a respective one of the two or more portions of a respective one of the available frequency resources.

18. The method of claim 13, wherein the direction information comprises an indicator indicating a frequency format.

19. The method of claim 18, wherein:
transmitting the direction information comprises:
generating a control message including the indicator indicating the frequency format; and
transmitting the control message to the UE; and
the method further comprises:
generating a position indicator indicating a position of the indicator in the control message; and
transmitting the position indicator to the UE.

20. An apparatus for wireless communication, comprising:
at least one processor;
at least one memory coupled with the at least one processor; and
instructions stored in the at least one memory and executable by the at least one processor to cause the apparatus to:
generate an indication of available frequency resources;
transmit the indication of the available frequency resources and direction information to a user equipment (UE), wherein the direction information indicates an in-band full duplex direction for at least one of the available frequency resources; and
communicate with the UE using the available frequency resources based on the direction information.

21. The apparatus of claim 20, further comprising instructions executable by the at least one processor to cause the apparatus to transmits a channel occupancy time (COT) duration to the UE, wherein the instructions executable by the at least one processor to cause the apparatus to communicate with the UE using the available frequency resources comprise instructions executable by the at least one processor to cause the apparatus to communicate with the UE using the available frequency resources within the COT duration.

22. The apparatus of claim 20, wherein the direction information comprises indicators, each of the indicators indicating a communication direction for a respective one of the available frequency resources.

23. The apparatus of claim 22, wherein each of the indicators indicates an uplink (UL) direction, a downlink (DL) direction, or the in-band full duplex direction for the respective one of the available frequency resources.

24. The apparatus of claim 20, wherein:
each of the available frequency resources comprises two or more portions; and
the direction information comprises indicators, each of the indicators indicating a communication direction for a respective one of the two or more portions of a respective one of the available frequency resources.

25. The apparatus of claim 20, wherein the direction information comprises an indicator indicating a frequency format.

26. The apparatus of claim 25, wherein:
the instructions executable by the at least one processor to cause the apparatus to transmit the direction information comprise instructions executable by the at least one processor to cause the apparatus to:
generate a control message including the indicator indicating the frequency format; and
transmit the control message to the UE; and
the instructions cause the apparatus to:
generate a position indicator indicating a position of the indicator in the control message; and
transmit the position indicator to the UE.

27. A method of wireless communication at a user equipment (UE), comprising:
receiving an indication of available frequency resources, wherein each of the available frequency resources is approximately 20 MHz;
receiving direction information;
selecting one or more communication directions for each of the available frequency resources based on the direction information, wherein selecting the one or more communication directions for each of the available frequency resources comprises selecting an uplink (UL) direction for a first portion of one of the available frequency resources in a frequency domain and a downlink (DL) direction for a second portion of the one of the available frequency resources in the frequency domain based on the direction information; and
communicating with a base station using the available frequency resources based on the one or more communication directions for each of the available frequency resources.

* * * * *